(12) United States Patent
Zhou et al.

(10) Patent No.: US 7,295,220 B2
(45) Date of Patent: Nov. 13, 2007

(54) INTERACTIVE SYSTEM AND METHOD

(75) Inventors: Zhi Ying Zhou, Singapore (SG); Adrian David Cheok, Singapore (SG); Jiun Horng Pan, Singapore (SG)

(73) Assignee: National University of Singapore, Singapore (SG)

( * ) Notice: Subject to any disclaimer, the term of this patent is extended or adjusted under 35 U.S.C. 154(b) by 96 days.

(21) Appl. No.: 10/857,698

(22) Filed: May 28, 2004

(65) Prior Publication Data

US 2005/0264555 A1 Dec. 1, 2005

(51) Int. Cl.
*G06T 15/00* (2006.01)
(52) U.S. Cl. .................. 345/632; 345/582; 345/619
(58) Field of Classification Search ........... 345/582, 345/418, 419, 619, 629, 630, 631, 632, 581, 345/586, 622, 651
See application file for complete search history.

(56) References Cited

U.S. PATENT DOCUMENTS 6,655,597 B1 * 12/2003 Swartz et al. .......... 235/462.45
7,050,102 B1 * 5/2006 Vincent ................. 348/333.02

OTHER PUBLICATIONS

Young, "Magic Cube Conjures Stories from Thin Air," New Scientist, Feb. 2004, vol. 181 No. 2436, p. 22.
Fjeld et al., "Chemistry Education: A Tangible Interaction Approach," Proceedings of INTERACT2003, Sep. 1-5, 2003, Zurich, Switzerland (8 pgs).
Cheok et al., "Interacting in a Virtual World," Innovation—The Magazine of Research & Technology, 2004, vol. 4 No. 2, 2004, pp. 73-75.
Zhou et al., "Interactive Entertainment Systems Using Tangible Cubes," Australian Workshop on Interactive Entertainment (IE2004), Sydney, 2004, pp. 19-22.
International Preliminary Report on Patentability for International Application No. PCT/SG2005/000146, filed May 9, 2005, report completed Jun. 29, 2006, 3 pgs.
Written Opinion of the International Preliminary Examining Authority for International Application No. PCT/SG2005/000146, filed May 9, 2005, mailed Apr. 27, 2006, 4 pgs.
International Search Report for International Application No. PCT/SG2005/000146, filed May 9, 2005, completed Jul. 5, 2005, mailed Jul. 8, 2005, 5 pgs.
Colvin et al., "A Dice Game in Third-Person Augmented Reality", Proc. 2nd IEEE International Augmented Reality Toolkit Workshop, Oct. 2003, 2 pgs.

(Continued)

*Primary Examiner*—Phu K. Nguyen
(74) *Attorney, Agent, or Firm*—Christie, Parker & Hale, LLP.

(57) ABSTRACT

An interactive system for providing a mixed reality experience to a user, the system including an object having at least two surfaces, where each surface having a marker. The system also including an image capturing device to capture images of the object in a first scene and a microprocessor configured to track the position and orientation of the object in the first scene by tracking at least two surfaces of the object and identifying at least one marker. In addition, the microprocessor is also configured retrieve multimedia content associated with an identified marker and generates a second scene including the associated multimedia content superimposed over the first scene in a relative position to the identified marker and the microprocessor is configured to provide a mixed reality experience to a user using the second scene.

49 Claims, 20 Drawing Sheets

OTHER PUBLICATIONS

Kato et al., "Virtual Object Manipulation on a Table-Top Environment", Proc. International Symposium on Augmented Reality, Oct. 2000, 9 pgs.

Poupyrev et al., "Developing A Generic Augmented-Reality Interface", Computer, Mar. 2002, pp. 2-9.

Sinclair et al., "Links in the Palm of Your Hand: Tangible Hypermedia Using Augmented Reality", Proc. 13th ACM Conference on Hypertext and Hypermedia, Jun. 2002, pp. 127-136.

Martens et al., "Experiencing 3D Interactions in Virtual Reality and Augmented Reality", Proc. 2nd European Union Symposium on Ambient Intelligence, Nov. 2003, 4 pgs.

Huang et al., "Tangible Photorealistic Virtual Museum", IEEE Computer Graphics and Applications, Feb. 2004, vol. 25, No. 1, pp. 15-17.

* cited by examiner

| State | Top Face | Physical Action | Physical Property | Digital Method | Digital Attribute | Classes inherited from | |
|---|---|---|---|---|---|---|---|
| 1 | | Screw | Angle of cube with respect to normal | Select file index | File index of file in folder/database | Image, Movie & 3D Animated Object | ~19 |
| 2 | | Screw | Angle of cube with respect to normal | Scale X-Y | Size | Image, Movie & 3D Animated Object | ~20 |
| 3 | | Translate | Displacement from original position | Translate | x-y-z position | Image, Movie & 3D Animated Object | ~21 |
| 4 | | Screw | Angle of cube with respect to normal | Set Frame | Frame Position | Movie & 3D Animated Object | ~22 |
| 5 | | Screw | Angle of cube with respect to normal | Set Play/Pause Set Animate/Pause | Play/Pause | Movie & 3D Animated Object | ~23 |
| 6 | | Screw | Angle of cube with respect to normal | Adjust Volume | Volume | Movie | ~24 |

Figure 2

| State | Physical State of Cube | Digital Object |
|---|---|---|
| 1 | 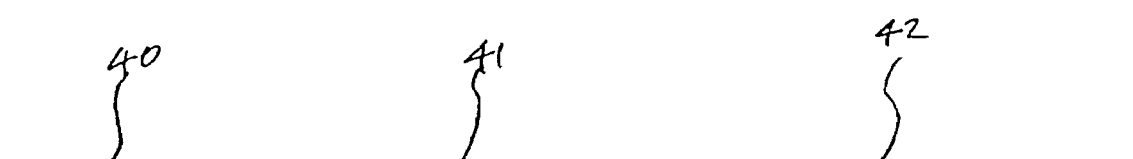 | → Animation sequence for page 1 |
| 2 | 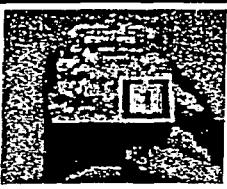 | → Animation sequence for page 2 |
| ... 6 | | → |
Figure 4

INTERACTIVE SYSTEM AND METHOD

CROSS REFERENCE TO RELATED APPLICATIONS

This application is related to the following applications filed May 28, 2004: (1) MOBILE PLATFORM, having U.S. application Ser. No. 10/857,048; (2) MARKETING PLATFORM, having U.S. application Ser. No. 10/856,040; (3) A GAME, having U.S. application Ser. No. 10/856,895; and (4) AN INTERACTIVE SYSTEM AND METHOD, having U.S. application Ser. No. 10/856,177. The contents of these four related applications are expressly incorporated herein by reference as if set forth in full.

TECHNICAL FIELD

The invention concerns an interactive system for providing a mixed reality experience to a user.

BACKGROUND OF THE INVENTION

Relatively little change has occurred regarding user interfaces for computers. For decades, the standard input devices for a computer included a keyboard and mouse. Recent popular developments have included wireless keyboards and mice that communicate to a desktop terminal using Bluetooth or Radio Frequency. This eliminates the needs for cables, but requires the keyboard and mouse to use batteries. Another intuitive input method is voice recognition. This requires the computer to recognize and understand the voice of a user, and carry out a corresponding command. Voice recognition can require training the computer to recognize the speech patterns of a user. However, accuracy is still dependent on the processing power of the computer, the quality of the microphone and the clarity of the words spoken by the user.

SUMMARY OF THE INVENTION

In a first preferred aspect, there is provided an interactive system for providing a mixed reality experience to a user, the system comprising includes an object having at least two surfaces, each surface having a marker. The system also includes an image capturing device to capture images of the object in a first scene and a microprocessor to track the position and orientation of the object in the first scene by tracking at least two surfaces of the object and identifying at least one marker. In addition, the microprocessor is configured to retrieve multimedia content associated with an identified marker, and generates a second scene including the associated multimedia content superimposed over the first scene in a relative position to the identified marker, to provide a mixed reality experience to a user.

Advantageously, if the top surface of the object is occluded, the marker on the top surface is ascertainable and tracking of the object is possible by being able to identify a marker on another surface.

In another aspect, the marker includes a discontinuous border that has a single gap. Advantageously, the gap breaks the symmetry of the border and therefore increases the dissimilarity of the markers.

In a further aspect, the marker comprises an image within the border. The image may be a geometrical pattern to facilitate template matching to identify the marker. The pattern may be matched to an exemplar stored in a repository of exemplars.

In yet another aspect of the invention, the border and the image are black on a white background. In several embodiments, this can lessen the adverse effects of varying lighting conditions.

The marker may be unoccluded to identify the marker.

The marker may be a predetermined shape. To identify the marker, at least a portion of the shape is recognized by the computer software. The microprocessor may be configured to determine the complete predetermined shape of the marker using the detected portion of the shape. For example, if the predetermined shape is a square, the microprocessor is configured to determine that the marker is a square if one corner of the square is occluded.

The microprocessor may also be configured to identify a marker if the border is partially occluded and if the pattern within the border is not occluded.

The interactive system may further comprise a display device such as a monitor, television screen or LCD, to display the second scene at the same time the second scene is generated. The display device may be a view finder of the image capture device or a projector to project images or video. The video frame rate of the display device may be in the range of twelve to thirty frames per second.

The image capture device may be mounted above the display device, and both the image capture device and display device may face the user. The object may be manipulated between the user and the display device.

Multimedia content may include 2D or 3D images, video and audio information.

In a still further aspect of the invention, the at least two surfaces of the object are substantially planar. Preferably, the at least two surfaces are joined together.

The object may be a cube or polyhedron.

The object may be foldable, for example, a foldable cube for storytelling.

The microprocessor may be part of a desktop or mobile computing device such as a Personal Digital Assistant (PDA), mobile telephone or other mobile communications device.

The image capturing device may be a camera. The camera may be CCD or CMOS video camera.

The camera, microprocessor and display device may be provided in a single integrated unit.

The camera, microprocessor and display device may be located in remote locations.

The associated multimedia content may be superimposed over the first scene by rendering the associated multimedia content into the first scene, for every video frame to be displayed.

The position of the object may be calculated in three dimensional space A positional relationship may be estimated between the camera and the object.

The camera image may be thresholded. Contiguous dark areas may be identified using a connected components algorithm.

A contour seeking technique may identify the outline of these dark areas. Contours that do not contain four corners may be discarded. Contours that contain an area of the wrong size may be discarded.

Straight lines may be fitted to each side of the square contour. The intersections of the straight lines may be used as estimates of the corner positions.

A projective transformation may be used to warp the region described by these corners to a standard shape. The standard shape may be cross-correlated with stored exemplars of markers to find the marker's identity and orientation.

The positions of the marker corners may be used to identify a unique Euclidean transformation matrix relating to the camera position to the marker position.

The interactive system may be a story telling application or an interior design application.

Yet another aspect of the invention again includes an image capturing device to capture images of an object in a first scene and a microprocessor configured to track the position and orientation of the object in the first scene by tracking at least two surfaces of the object having a marker and identifying at least one marker. In addition, the microprocessor is configured to retrieve multimedia content associated with an identified marker, and generates a second scene including the associated multimedia content superimposed over the first scene in a relative position to the identified marker and the microprocessor is also configured to provide a mixed reality experience to a user using the second scene.

Yet another aspect of the invention again includes an image processing module to receive captured images of an object in a first scene from an image capturing device and a tracking module to track the position and orientation of the object in the first scene by tracking at least two surfaces of the object where each surface has a marker, and identifying at least one marker. In addition, the image processing module is configured to retrieve multimedia content associated with an identified marker, and generates a second scene including the associated multimedia content superimposed over the first scene in a relative position to the identified marker and the image processing module is also configured to provide a mixed reality experience to a user using the second scene.

A still further aspect of the invention again includes a data receiver to receive marker identification data related to an identified marker and a searching tool to search a virtual object database for a virtual object corresponding to the marker identification data. In addition, if a match is found, the virtual object is superimposed over a real scene in a relative position to the identified marker, to provide a mixed reality experience to a user.

An identified marker may have more than one corresponding virtual object.

Yet another further aspect of the invention includes an identification data field to identify each item of multimedia content and a content data field to store an item of multimedia content or storage location of an item of multimedia content. In addition, the marker identification data related to an identified marker is searched against the identification data field, and multimedia content associated with the identified marker is retrieved to be superimposed over a real scene in a relative position to the identified marker, to provide a mixed reality experience to a user.

Yet another still further aspect of the invention includes a signal indicative of graphical information containing a real scene and multimedia content associated with an identified marker superimposed over the real scene in a relative position to the identified marker. In addition, the identified marker is identified by tracking at least two surfaces of an object having a marker on each surface.

The signal may further comprise audio information associated with an identified marker.

Yet still another further aspect of the invention again includes at least two surfaces and a marker on each surface, the marker including a discontinuous border and an image within the border. In addition, wherein the discontinuity in the border indicates the alignment of the image within the border and orientation of the object.

The position and orientation of the object may be tracked by tracking at least one surface of the object.

Another aspect of the invention includes a discontinuous border and an image within the border. In addition, to identify the marker in a scene, the border is located within the scene, and the image within the border is searched to find a matching image in an image repository.

When a marker is identified, computer software may retrieve multimedia content associated with the identified marker.

Another aspect of the invention includes calculating a corresponding transformation matrix for each surface of the object having a marker, identifying a surface having the highest tracking confidence and calculating the transformation matrix from a marker co-ordinate system to an object co-ordinate system based on the physical relationship of the identified surface and the object. In addition, the transformation matrix from the object co-ordinate system to a camera co-ordinate system is calculated by subtracting the object co-ordinate system from the corresponding transformation matrix of the identified surface.

Another aspect of the invention includes an image capture module to capture images of an object in a first scene and a tracking module to track the position and orientation of the object in the first scene by tracking at least two surfaces of the object where each surface has a marker, and identifying at least one marker. In addition, the device retrieves multimedia content associated with an identified marker, and generates a second scene including the associated multimedia content superimposed over the first scene in a relative position to the identified marker, to provide a mixed reality experience to a user.

Another aspect of the invention includes receiving captured images of an object in a first scene from an image capturing device and tracking the position and orientation of the object in the first scene by tracking at least two surfaces of the object where each surface has a marker, and identifying at least one marker. In addition multimedia content associated with an identified marker is retrieved, and a second scene including the associated multimedia content superimposed over the first scene in a relative position to the identified marker is generated, to provide a mixed reality experience to a user.

BRIEF DESCRIPTION OF THE DRAWINGS

An example of the invention will now be described with reference to the accompanying drawings, in which:

FIG. 2 is a table showing the mapping of states and couplings defined in a "method cube" of the interactive system;

FIG. 4 is a table showing the virtual coupling in a 3D Magic Story Cube application;

DETAILED DESCRIPTION OF THE DRAWINGS

The drawings and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
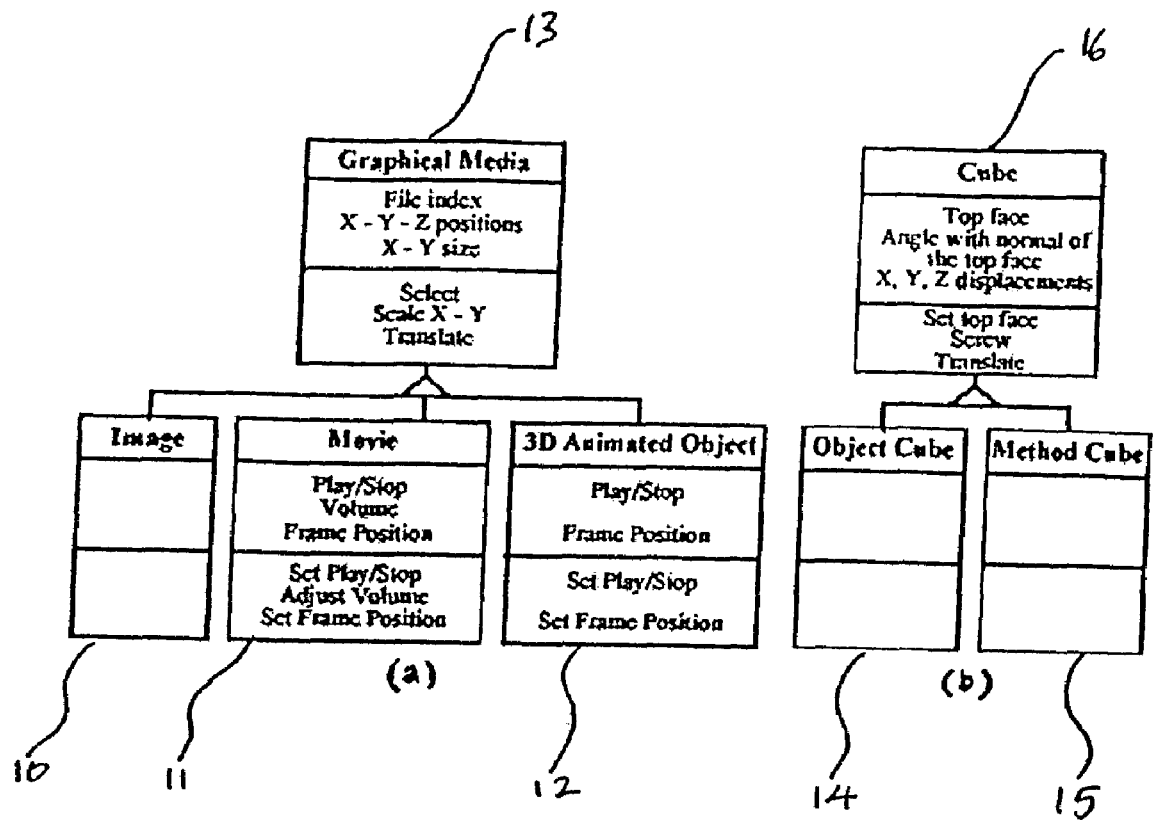
FIG. 1 is a class diagram showing the abstraction of graphical media and cubes of the interactive system.

Referring to FIG. 1, an interactive system is provided to allow interaction with a software application on a computer. In this example, the software application is a media player application for playing media files. Media files include AVI movie files or WAV audio files. The interactive system comprises software programmed using Visual C++ 6.0 on the Microsoft Windows 2000 platform, a computer monitor, and a Dragonfly Camera mounted above the monitor to track the desktop area.

Complex interactions using a simple Tangible User Interface (TUI) are enabled by applying Object Oriented Tangible User Interface (OOTUI) concepts to software development for the interactive system. The attributes and methods from objects of different classes are abstracted using Object Oriented Programming (OOP) techniques. FIG. 1 at (a), shows the virtual objects (Image 10, Movie 11, 3D Animated Object 12) structured in a hierarchical manner with their commonalities classified under the super class, Graphical Media 13. The three subclasses that correspond to the virtual objects are Image 10, Movie 11 and 3D Animated Object 12. These subclasses inherit attributes and methods from the Graphical Media super class 13. The Movie 11 and 3D Animated Object 12 subclasses contain attributes and methods that are unique to their own class. These attributes and methods are coupled with physical properties and actions of the TUI decided by the state of the TUI. Related audio information can be associated with the graphical media 11, 12, 13, such as sound effects. In the system, the TUI allows control of activities including searching a database of files and sizing, scaling and moving of graphical media 11, 12, 13. For movies and 3D objects 11, 12, activities include playing/pausing, fast-forwarding and rewinding media files. Also, the sound volume is adjustable.

In this example, the TUI is a cube. A cube in contrast to a ball or complex shapes, has stable physical equilibriums on one of its surfaces making it relatively easier to track or sense. In this system, the states of the cube are defined by these physical equilibriums. Also, cubes can be piled on top of one another. When piled, the cubes form a compact and stable physical structure. This reduces scatter on the interactive workspace. Cubes are intuitive and simple objects familiar to most people since childhood. A cube can be grasped which allows people to take advantage of keen spatial reasoning and leverages off prehensile behaviours for physical object manipulations.

The position and movement of the cubes are detected using a vision-based tracking algorithm to manipulate graphical media via the media player application. Six different markers are present on the cube, one marker per surface. In other instances, more than one marker can be placed on a surface. The position of each marker relative to each other is known and fixed because the relationship of the surfaces of the cube is known. To identify the position of the cube, any one of the six markers is tracked. This ensures continuous tracking even when a hand or both hands occlude different parts of the cube during interaction. This means that the cubes can be intuitively and directly handled with minimal constraints on the ability to manipulate the cube.

The state of artefact is used to switch the coupling relationship with the classes. The states of each cube are defined from the six physical equilibriums of a cube, when the cube is resting on any one of its faces. For interacting with the media player application, only three classes need to be dealt with. A single cube provides adequate couplings with the three classes, as a cube has six states. This cube is referred to as an "Object Cube" 14.

However, for handling the virtual attributes/methods 17 of a virtual object, a single cube is insufficient as the maximum number of couplings has already reached six, for the Movie 11 and 3D Animated object 12 classes. The total number of couplings is six states of a cube<3 classes+6 attributes/methods 17. This exceeds the limit for a single cube. Therefore, a second cube is provided for coupling the virtual attribute/methods 17 of a virtual object. This cube is referred to as a "Method Cube" 15.

The state of the "Object Cube" 14 decides the class of object displayed and the class with which the "Method Cube" 15 is coupled. The state of the "Method Cube" 15 decides which virtual attribute/method 17 the physical property/action 18 is coupled with. Relevant information is structured and categorized for the virtual objects and also for the cubes. FIG. 1, at (b) shows the structure of the cube 16 after abstraction.

The "Object Cube" 14 serves as a database housing graphical media. There are three valid states of the cube. When the top face of the cube is tracked and corresponds to one of the three pre-defined markers, it only allows displaying the instance of the class it has inherited from, that is the type of media file in this example. When the cube is rotated or translated, the graphical virtual object is displayed as though it was attached on the top face of the cube. It is also possible to introduce some elasticity for the attachment between the virtual object and physical cube. These states of the cube also decide the coupled class of "Method Cube" 15, activating or deactivating the couplings to the actions according to the inherited class.

Referring to FIG. 2, on the 'Method Cube' 15, the properties/actions 18 of the cube are respectively mapped to the attributes/methods 17 of the three classes of the virtual object. Although there are three different classes of virtual object which have different attributes and methods, new interfaces do not have to be designed for all of them. Instead, redundancy is reduced by grouping similar methods/properties and implementing the similar methods/properties using the same interface.

In FIG. 2, methods 'Select' 19, 'Scale X-Y' 20 and 'Translate' 21 are inherited from the Graphical Media superclass 13. They can be grouped together for control by the same interface. Methods 'Set Play/Stop' 23, 'Set Animate/Stop', 'Adjust Volume' 24 and 'Set Frame Position' 22 are methods exclusive to the individual classes and differ in implementation. Although the methods 17 differ in implementation, methods 17 encompassing a similar idea or concept can still be grouped under one interface. As shown, only one set of physical property/action 18 is used to couple with the 'Scale' method 20 which all three classes have in common. This is an implementation of polymorphism in OOTUI. This is a compact and efficient way of creating TUIs by preventing duplication of interfaces or information across classifiable classes and the number of interfaces in the system is reduced. Using this methodology, the number of interfaces is reduced from fifteen (methods for image—three interfaces, movie—six interfaces, 3D object—six interfaces) to six interfaces. This allows the system to be handled by six states of a single cube.

Figure 3:
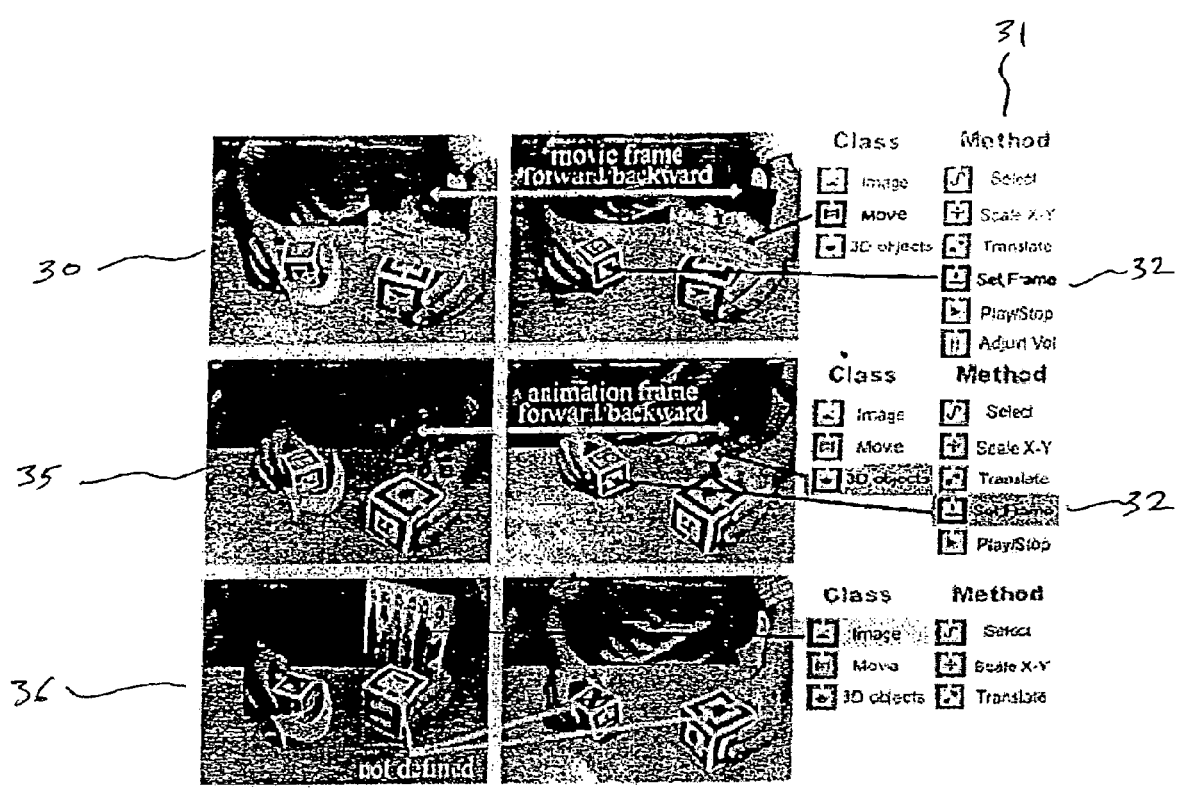
FIG. 3 is a table showing inheritance in the interactive system.

Referring to FIG. 3, the first row of pictures 30 shows that the cubes inherit properties for coupling with methods 31 from 'movie' class 11. The user is able to toggle through the scenes using the 'Set Frame Method' 32 which is in the inherited class. The second row shows the user doing the same task for the '3D object' class 12. The first picture in the third row 36 shows that 'image' class 10 does not inherit the 'Set Frame Method' 32 hence a red cross appears on the surface. The second picture shows that the 'Object Cube' 14 is in an undefined state indicated by a red cross.

The rotating action of the 'Method Cube' 15 to the 'Set Frame' 32 method of the movie 11 and animated object 12 is an intuitive interface for watching movies. This method indirectly fulfils functions on a typical video-player such as 'fast-forward' and 'rewind'. Also, the 'Method Cube' 15 allows users to 'play/pause' the animation.

The user can size graphical media of all the three classes by the same action, that is, by rotating the 'Method Cube' 15 with "+" as the top face (state 2). This invokes the 'Size' method 20 which changes the size of the graphical media with reference to the angle of the cube to the normal of its top face. From the perspective of a designer of TUIs, the 'Size' method 20 is implemented differently for the three classes 10, 11,12. However, this difference in implementation is not perceived by the user and is transparent.

To enhance the audio and visual experience for the users, visual and audio effects are added to create an emotionally evocative experience. For example, an animated green circular arrow and a red cross are used to indicate available actions. Audio feedback include a sound effect to indicate state changes for both the object and method cubes.

EXAMPLE

3D Magic Story Cube application

Another application of the interactive system is the 3D Magic Story Cube application. In this application, the story cube tells a famous Bible story, "Noah's Ark". Hardware required by the application includes a computer, a camera and a foldable cube. Minimum requirements for the computer are at least of 512 MB RAM and a 128 MB graphics card. In one example, an IEEE 1394 camera is used. An IEEE 1394 card is installed in the computer to interface with the IEEE 1394 camera. Two suitable IEEE 1394 cameras for this application are the Dragonfly camera or the Firefly cameras manufactured by Pont Grey Research Inc. of Vancouver, Canada. Both of these cameras are able to grab color images at a resolution of 640×480 pixels, at a speed of 30 Hz. This is able to view the 3D version of the story whilst exploring the folding tangible cube. The higher the capture speed of the camera is, the more realistic the mixed reality experience is to the user due to a reduction in latency. The higher the resolution of the camera, the greater the image detail. A foldable cube is used as the TUI for 3D storytelling. Users can unfold the cube in a unilateral manner. Foldable cubes have previously been used for 2D storytelling with the pictures printed out on the cube's surfaces.

The software and software libraries used in this application are Microsoft Visual C++ 6.0, OpenGL, GLUT and MXR Development toolkit created by Microsoft Corporation of Redmond, Wash. Microsoft Visual C++ 6.0 is used as the development tool. It features a fully integrated editor, compiler, and debugger to make coding and software development easier. Libraries for other components are also integrated. In Virtual Reality (VR) mode, OpenGL and GLUT play important roles for graphics display. OpenGL is the premier environment for developing portable, interactive 2D and 3D graphics applications. OpenGL is responsible for all the manipulation of the graphics in 2D and 3D in VR mode. GLUT is the OpenGL Utility Toolkit and is a window system independent toolkit for writing OpenGL programs. It is used to implement a windowing application programming interface (API) for OpenGL. The MXR Development Toolkit enables developers to create Augmented Reality (AR) software applications. It is used for programming the applications mainly in video capturing and marker recognition. The MXR Toolkit is a computer vision tool to track fiducials and to recognise patterns within the fiducials. The use of a cube with a unique marker on each face allows for the position of the cube to be tracked by the computer by the MXR Toolkit continuously.

Referring to FIG. 4, the 3D Magic Story Cube application applies a simple state transition model 40 for interactive storytelling. Appropriate segments of audio and 3D animation are played in a pre-defined sequence when the user unfolds the cube into a specific physical state 41. The state transition is invoked only when the contents of the current state have been played. Applying OOTUI concepts, the virtual coupling of each state of the foldable cube can be mapped 42 to a page of digital animation.

Figure 5:
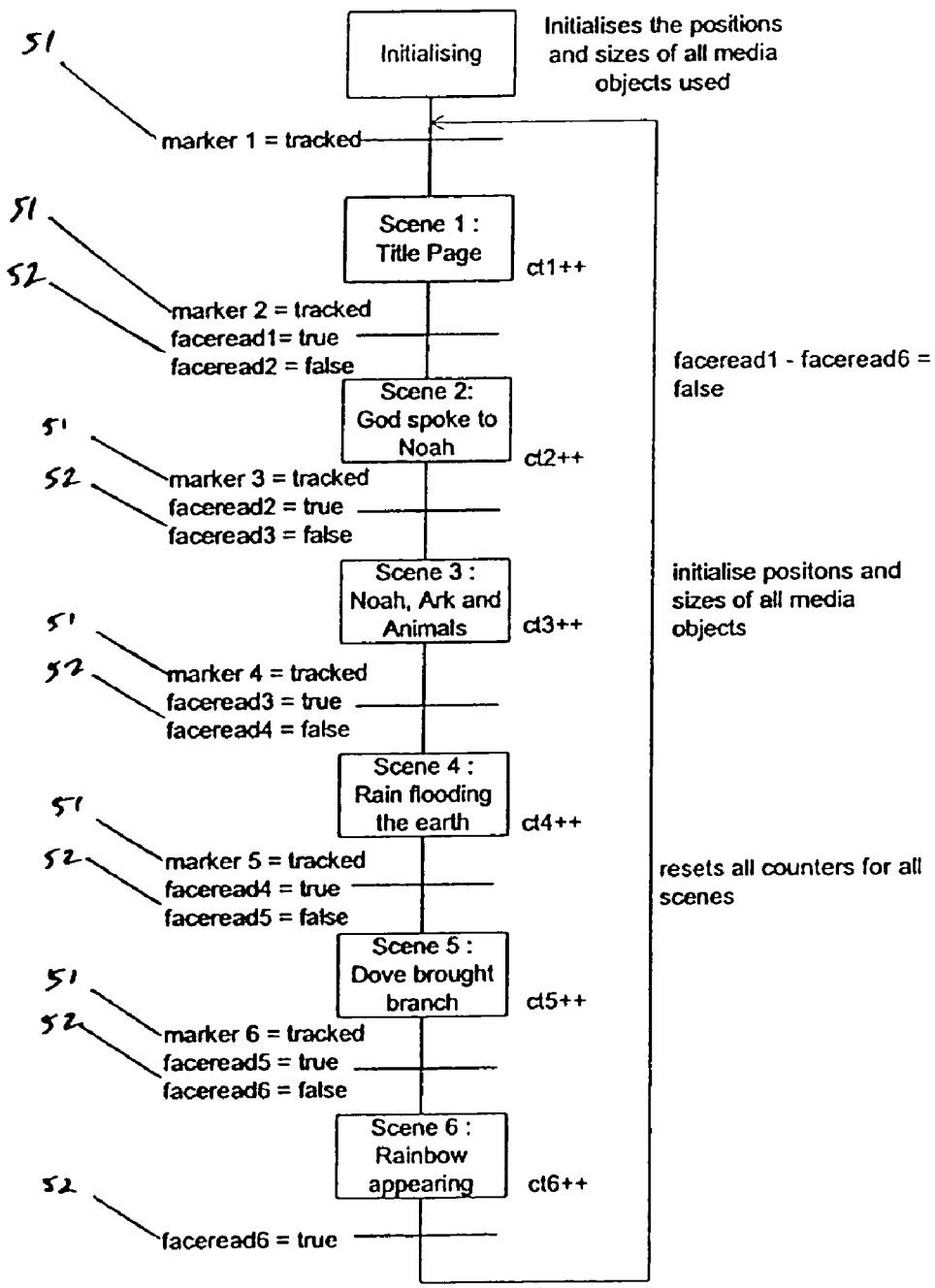
FIG. 5 is a process flow diagram of the 3D Magic Story Cube application.

Referring to FIG. 5, an algorithm 50 is designed to track the foldable cube that has a different marker on each unfolded page. The relative position of the markers is tracked 51 and recorded 52. This algorithm ensures continuous tracking and determines when a page has been played once through. This allows the story to be explored in a unidirectional manner allowing the story to maintain a continuous narrative progression. When all the pages of the story have played through once, the user can return to any page of the story to watch the scene play again.

A few design considerations that are kept in mind when designing the system is the robustness of the system during bad lighting conditions and the image resolution.

The unfolding of the cube is unidirectional allowing a new page of the story to be revealed each time the cube is unfolded. Users can view both the story illustrated on the cube in its non-augmented view (2D view) and also in its augmented view (3D view). The scenarios of the story are 3D graphics augmented on the surfaces of the cube.

The AR narrative provides an attractive and understandable experience by introducing 3D graphics and sound in addition to 3D manipulation and 3D sense of touch. The user is able to enjoy a participative and exploratory role in experiencing the story. Physical cubes offer the sense of touch and physical interaction which allows natural and intuitive interaction. Also, the physical cubes allow social storytelling between an audience as they naturally interact with each other.

To enhance user interaction and intuitiveness of unfolding the cube, animated arrows appear to indicate the direction of unfolding the cube after each page or segment of the story is played. Also, the 3D virtual models used have a slight transparency of 96% to ensure that the user's hands are still partially visible to allow for visual feedback on how to manipulate the cube.

The rendering of each page of the story cube is carried out when one particular marker is tracked. As the marker can be large, it is also possible to have multiple markers on one page. Since multiple markers are located on the same surface in a known layout, tracking one of the markers ensures tracking of the other markers. This is a performance issue to facilitate more robust tracking.

To assist with synchronisation, the computer system clock is used to increment the various counters used in the program. This causes the program to run at varying speeds for different computers. An alternative is to use a constant frame rates method in which a constant number of frames are rendered every second. To achieve constant frame rates, one second is divided in many equal sized time slices and the rendering of each frame starts at the beginning of each time slice. The application has to ensure that the rendering of each frame takes no longer than one time slice, otherwise the constant frequency of frames will be broken. To calculate the maximum possible frame rate for the rendering of the 3D Magic Story Cube application, the amount of time needed to render the most complex scene is measured. From this measurement, the number of frames per second is calculated.

EXAMPLE

Interior Design Application

A further application developed for the interactive system is the Interior Design application. In this application, the MXR Toolkit is used in conjunction with a furniture board to display the position of the room by using a book as a furniture catalogue.

MXR Toolkit provides the positions of each marker but does not provide information on the commands for interacting with the virtual object. The cubes are graspable allowing the user to have a more representative feel of the virtual object. As the cube is graspable (in contrast to wielding a handle), the freedom of movement is less constrained. The cube is tracked as an object consisting of six joined markers with a known relationship. This ensures continual tracking of the cube even when one marker is occluded or covered.

In addition to cubes, the furniture board has six markers. It possible to use only one marker on the furniture board to obtain a satisfactory level of tracking accuracy. However, using multiple fiducials enables robust tracking so long as one fiducial is not occluded. This is crucial for the continuous tracking of the cube and the board.

To select a particular furniture item, the user uses a furniture catalogue or book with one marker on each page. This concept is similar to the 3D Magic Story Cube application described. The user places the cube in the loading area beside the marker which represents a category of furniture of selection to view the furniture in AR mode.

Figure 14:
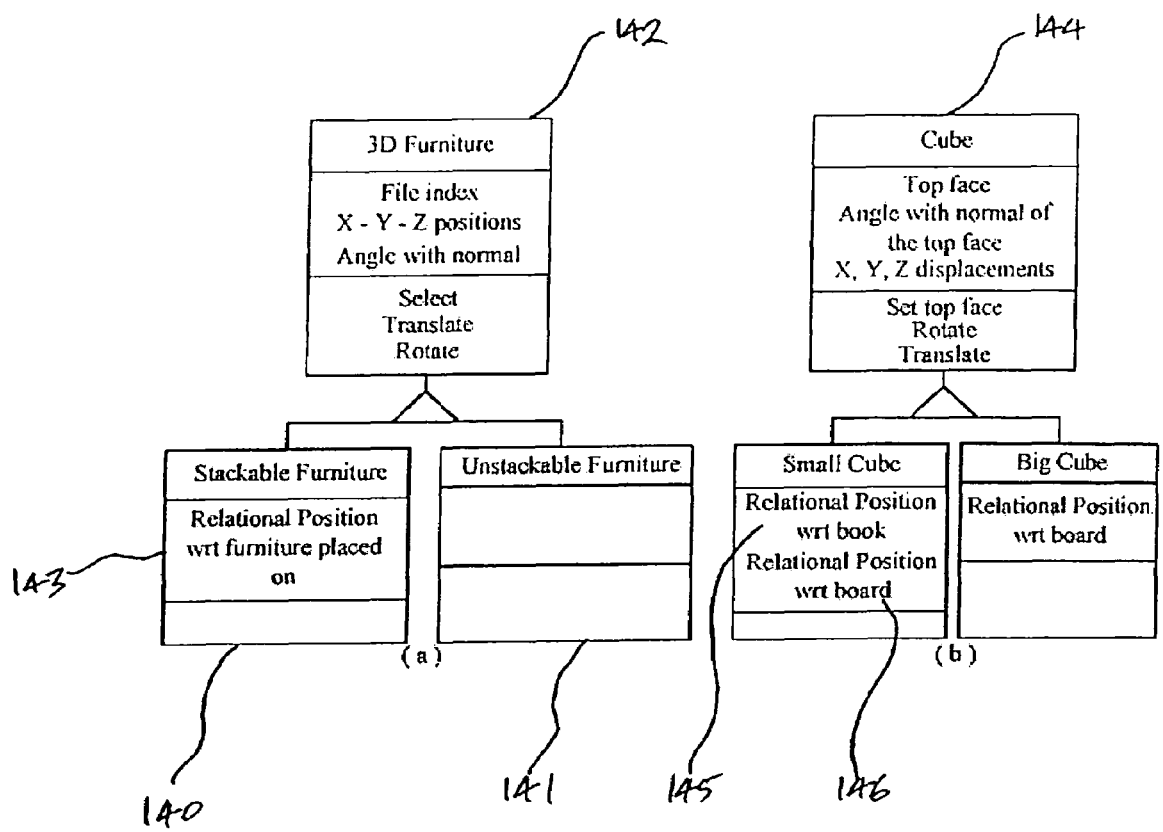
FIG. 14 is a class diagram illustrating abstraction and encapsulation of virtual and physical objects.

Referring to FIG. 14, prior to determining the tasks to be carried out using cubes, applying OOTUI allows a software developer to deal with complex interfaces. First, the virtual objects of interest and their attributes and methods are determined. The virtual objects are categorized into two groups: stackable objects 140 and unstackable objects 141. Stackable objects 140 are objects that can be placed on top of other objects, such as plants, TVs and Hi-Fi units. They can also be placed on the ground. Both groups 140, 141 inherit attributes and methods from their parent class, 3D Furniture 142. Stackable objects 140 have an extra attribute 143 of its relational position with respect to the object it is placed on. The result of this abstraction is shown in FIG. 14 at (a).

For virtual tool cubes 144, the six equilibriums of the cube are defined as one of the factors determining the states. There are a few additional attributes to this cube to be used in complement with a furniture catalogue and a board. Hence, we have a few additional attributes such as relational position of a cube with respect to the book 145 and board 146. These additional attributes coupled with the attributes inherited from the Cube parent class 144 determines the various states of the cube. This is shown in FIG. 14 at (b).

To pick up an object intuitively, the following is required:
1) Move into close proximity to a desired object
2) Make a 'picking up' gesture using the cube The object being picked up will follow that of the hand until it is dropped. When a real object is dropped, we expect the following:
1) Object starts dropping only when hand makes a dropping gesture
2) In accordance with the laws of gravity, the dropped object falls directly below that of the position of the object before it is dropped
3) If the object is dropped at an angle, it will appear to be at an angle after it is dropped.

These are the underlying principles governing the adding of a virtual object in Augmented Reality.

Figure 6:
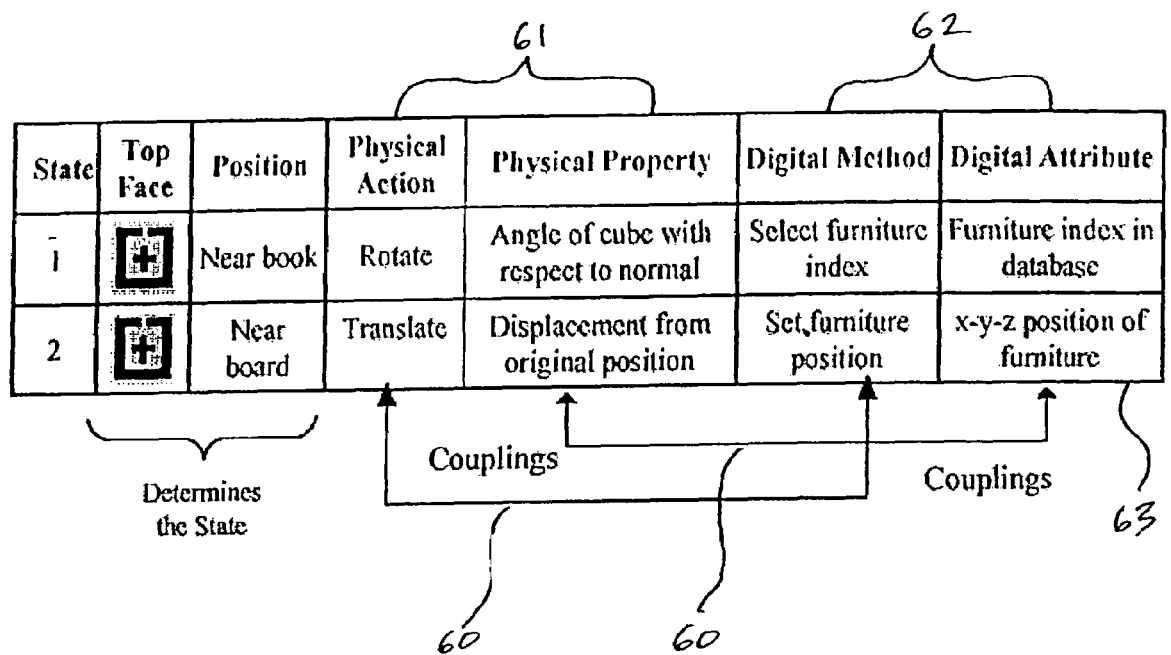
FIG. 6 is a table showing the virtual couplings to add furniture in an Interior Design application.

Referring to FIG. 6, applying OOTUI, the couplings 60 are formed between the physical world 61 and virtual world 62 for adding furniture. The concept of translating 63 the cube is used for other methods such as deleting and rearranging furniture. Similar mappings are made for the other faces of the cube.

To determine the relationship of the cube with respect to the book and the board, the position and proximity of the cubes with respect to the virtual object need to be found. Using the MXR Toolkit, co-ordinates of each marker with respect to the camera is known. Using this information, matrix calculations are performed to find the proximity and relative position of the cube with respect to other passive items including the book and board.

Figure 7:
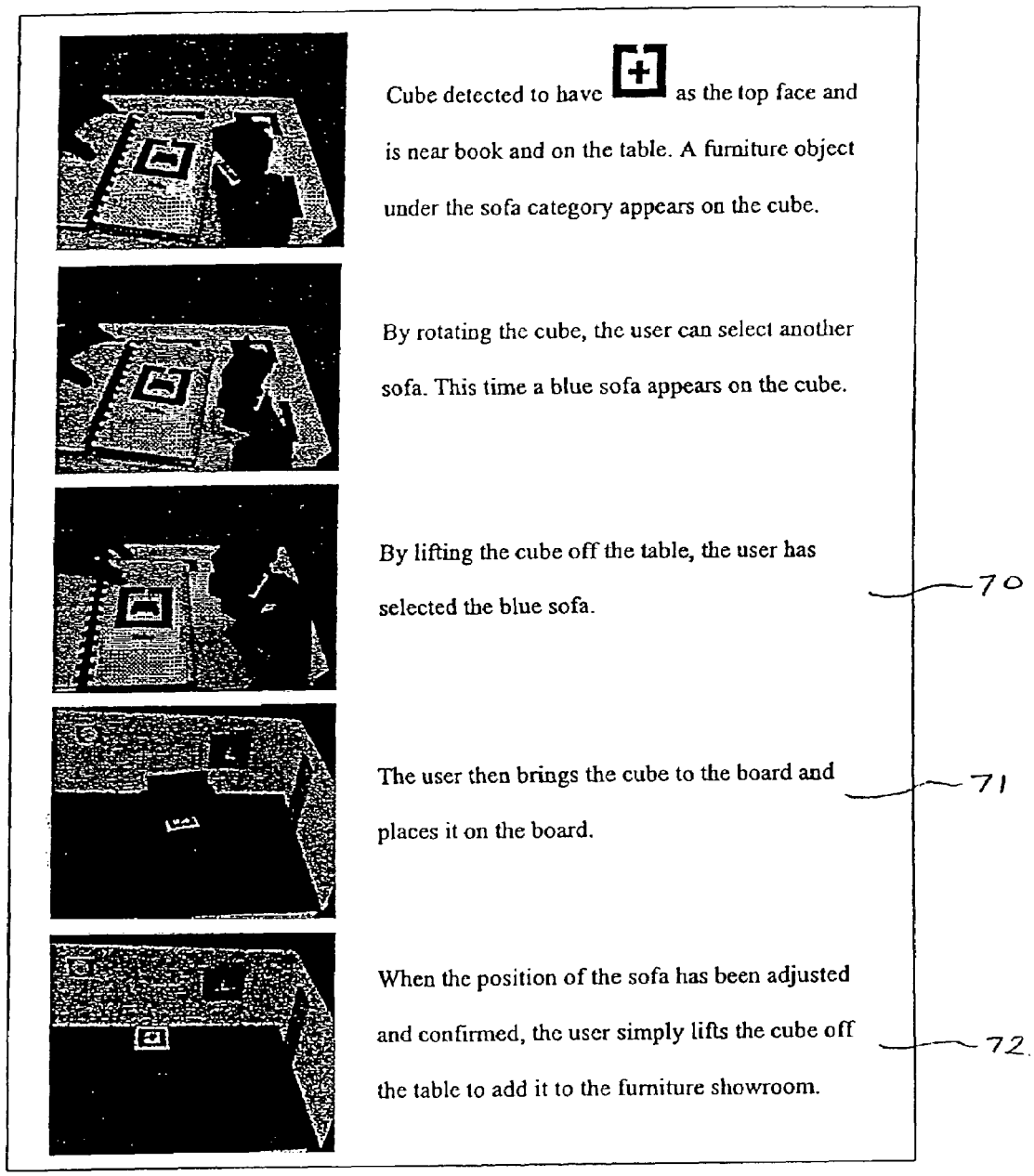
FIG. 7 is a series of screenshots to illustrate how the 'picking up' and 'dropping off' of virtual objects adds furniture to the board.

FIG. 7 shows a detailed continuous strip of screenshots to illustrate how the 'picking up' 70 and 'dropping off' 71 of virtual objects adds furniture 72 to the board.

Figure 8:
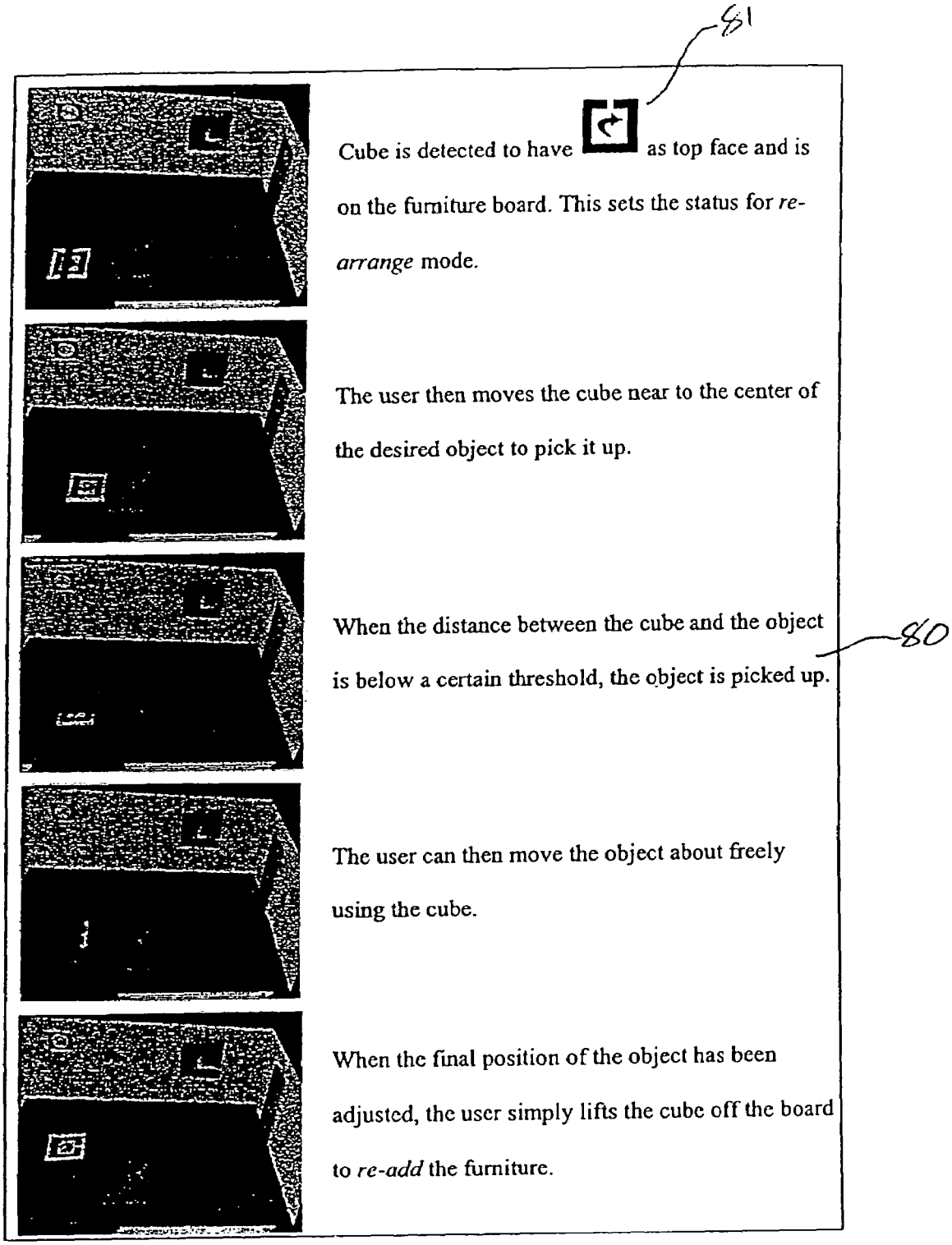
FIG. 8 is a series of screenshots to illustrate the method for re-arranging furniture.
Figure 9:
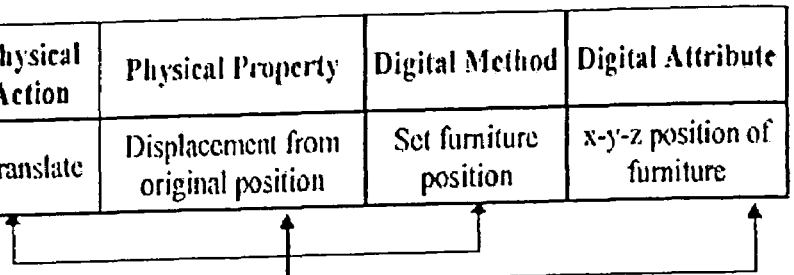
FIG. 9 is a table showing the virtual couplings to rearrange furniture.

Referring to FIG. 8, similar to adding a furniture item, the idea of 'picking up' 80 and dropping off' is also used for rearranging furniture. The "right turn arrow" marker 81 is used as the top face as it symbolises moving in all directions possible in contrast to the "+" marker which symbolises adding. FIG. 9 shows the virtual couplings to re-arrange furniture.

When designing the AR system, the physical constraints of virtual objects are represented as objects in reality. When introducing furniture in a room, there is a physical constraint when moving the desired virtual furniture in the room. If there is a virtual furniture item already in that position, the user is not allowed to 'drop off' another furniture item in that position. The nearest position the user can drop the furniture item is directly adjacent the existing furniture item on board.

Figure 10:
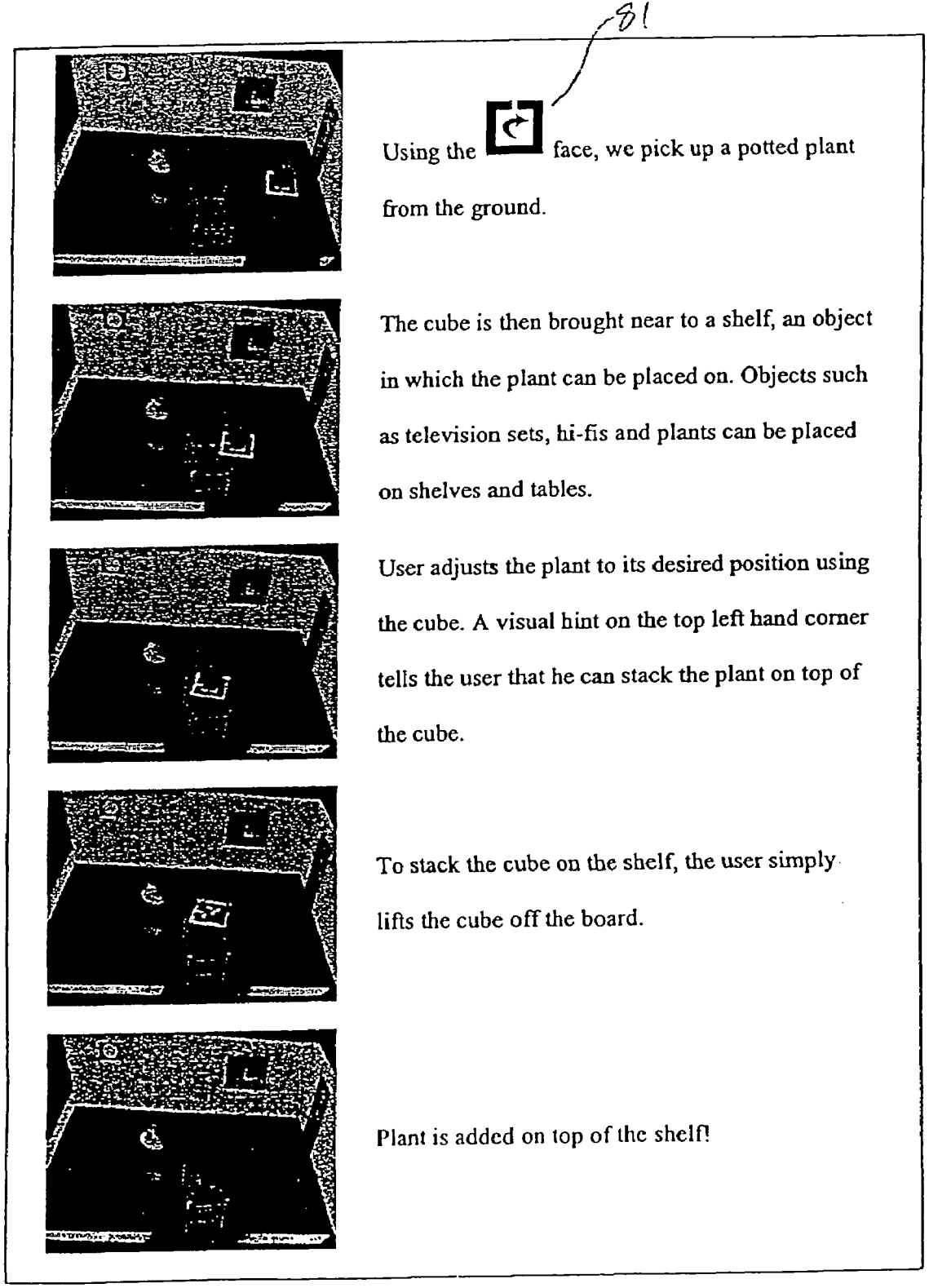
FIG. 10 is a series of screenshots to illustrate 'picking up' and 'dropping off' of virtual objects stacking furniture on the board.

Referring to FIG. 10, a smaller virtual furniture item can be stacked on to larger items. For example, items such as plants and television sets can be placed on top of shelves and tables as well as on the ground. Likewise, items placed on the ground can be re-arranged to be stacked on top of another item. FIG. 10 shows a plant picked up from the ground and placed on the top of a shelf.

Figure 11:
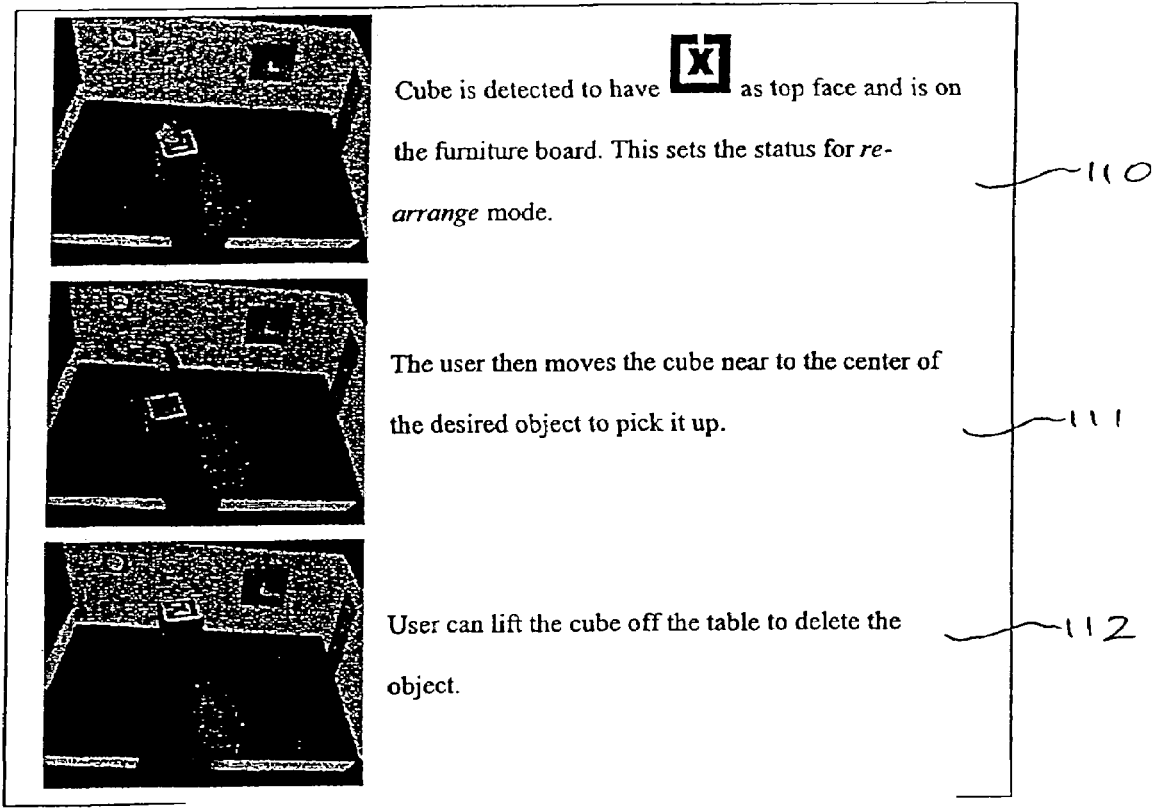
FIG. 11 is a series of screenshots to illustrate throwing out furniture from the board.
Figure 12:
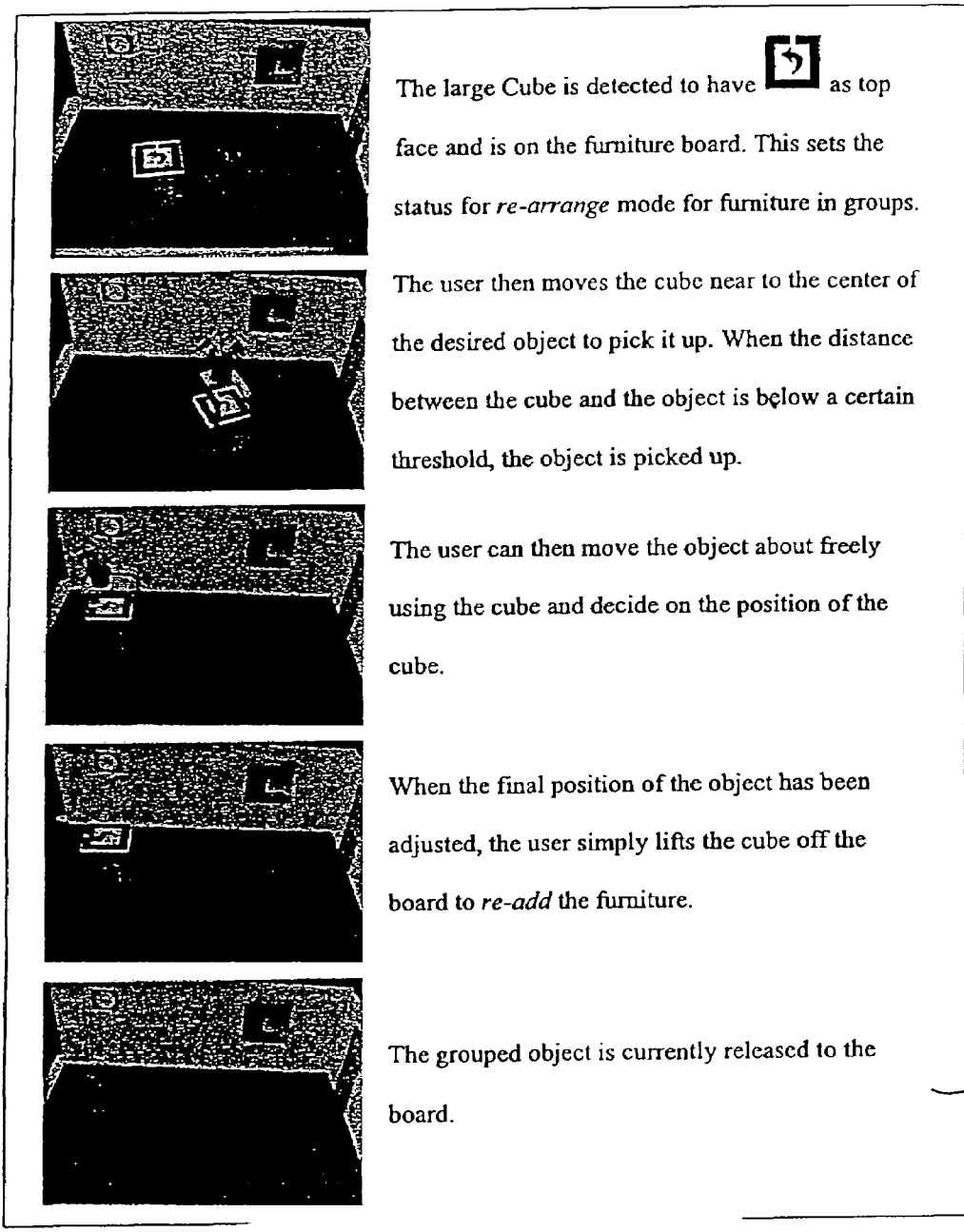
FIG. 12 is a series of screenshots to illustrate rearranging furniture collectively.

Referring to FIG. 11, to delete or throw out an object intuitively, the following is required:

1) Go to close proximity to desired object 110;
2) Make a 'picking up' gesture using the cube 111; and
3) Make a flinging motion with the hand 112;

Referring to FIG. 12, certain furniture items can be stacked on other furniture items. This establishes a grouped and collective relationship 120 with certain virtual objects. FIG. 12 shows the use of the big cube (for grouped objects) in the task of rearranging furniture collectively.

Visual and audio feedback are added to increase intuitiveness for the user. This enhances the user experience and also effectively utilises the user's sense of touch, sound and sight. Various sounds are added when different events take place. These events include selecting a furniture object, picking up, adding, re-arranging and deleting. Also, when a furniture item has collided with another object on the board, an incessant beep is continuously played until the user moves the furniture item to a new position. This makes the augmented tangible user interface more intuitive since providing both visual and audio feedback increases the interaction with the user.

The hardware used in the interior design application includes the furniture board and the cubes. The interior design application extends single marker tracking described earlier. The furniture board is two dimensional whereas the cube is three dimensional for tracking of multiple objects.

Figure 13:
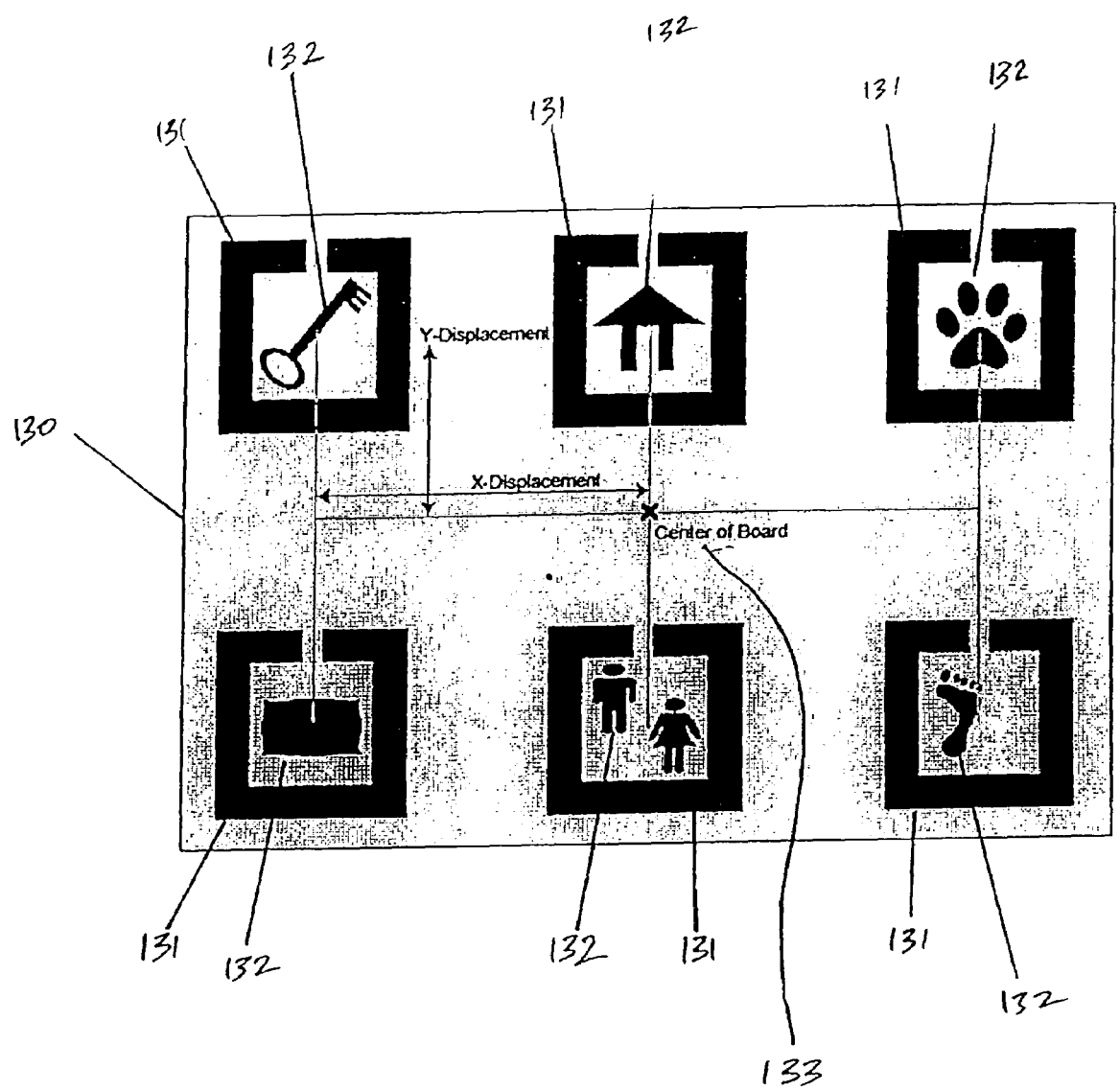
FIG. 13 is a pictorial representation of the six markers used in the Interior Design application.

Referring to FIG. 13, the method for tracking user ID cards is extended for tracking the shared whiteboard card 130. Six markers 131 are used to track the position of the board 130 so as to increase robustness of the system. The transformation matrix for multiple markers 131 is estimated from visible markers so errors are introduced when fewer markers are available. Each marker 131 has a unique pattern 132 in its interior that enables the system to identify markers 131, which should be horizontally or vertically aligned and can estimate the board rotation.

The showroom is rendered with respect to the calculated centre 133 of the board. When a specific marker above is being tracked, the centre 133 of the board is calculated using some simple translations using the preset X-displacement and Y-displacement. These calculated centres 133 are then averaged depending on the number of markers 131 tracked. This ensures continuous tracking and rendering of the furniture showroom on the board 130 as long as one marker 131 is being tracked.

When the surface of the marker 131 is approaching parallel to the line of sight, the tracking becomes more difficult. When the marker flips over, the tracking is lost. Since the whole area of the marker 131 must always visible to ensure a successful tracking, it does not allow any occlusions on the marker 131. This leads to the difficulties of manipulation and natural two-handed interaction.

Figure 15:
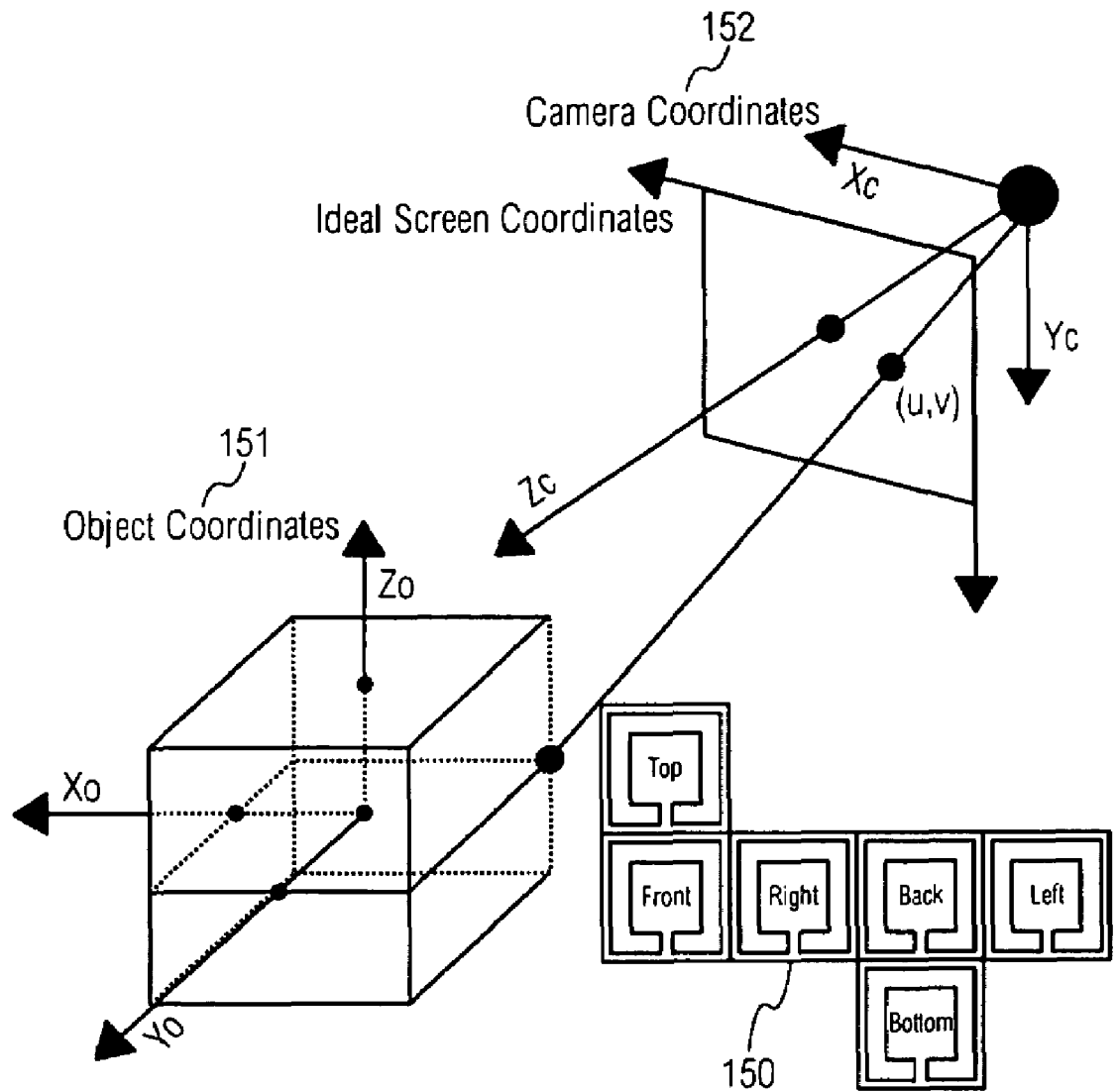
FIG. 15 is a schematic diagram illustrating the coordinate system of tracking cubes.

Referring to FIG. 15, one advantage of this algorithm is that it enables direct manipulation of cubes with both hands. When one hand is used to manipulate the cube, the cube is always tracked as long as at least one of the six faces of the cube is detected. The algorithm used to track the cube is as follows:

1. Detect all the surface markers 150 and calculate the corresponding transformation matrix (Tcm) for each detected surface.
2. Choose a surface with the highest tracking confidence and identify its surface ID, that is top, bottom, left, right, front, and back.
3. Calculate the transformation matrix from the marker co-ordinate system to the object co-ordinate system (Tmo) 151 based on the physical relationship of the chosen marker and the cube.
4. The transformation matrix from the object co-ordinate system 151 to the camera co-ordinate system (Tco) 152 is calculated by: $Tco = Tcm^{-1} \times Tmo$.

Figure 16:
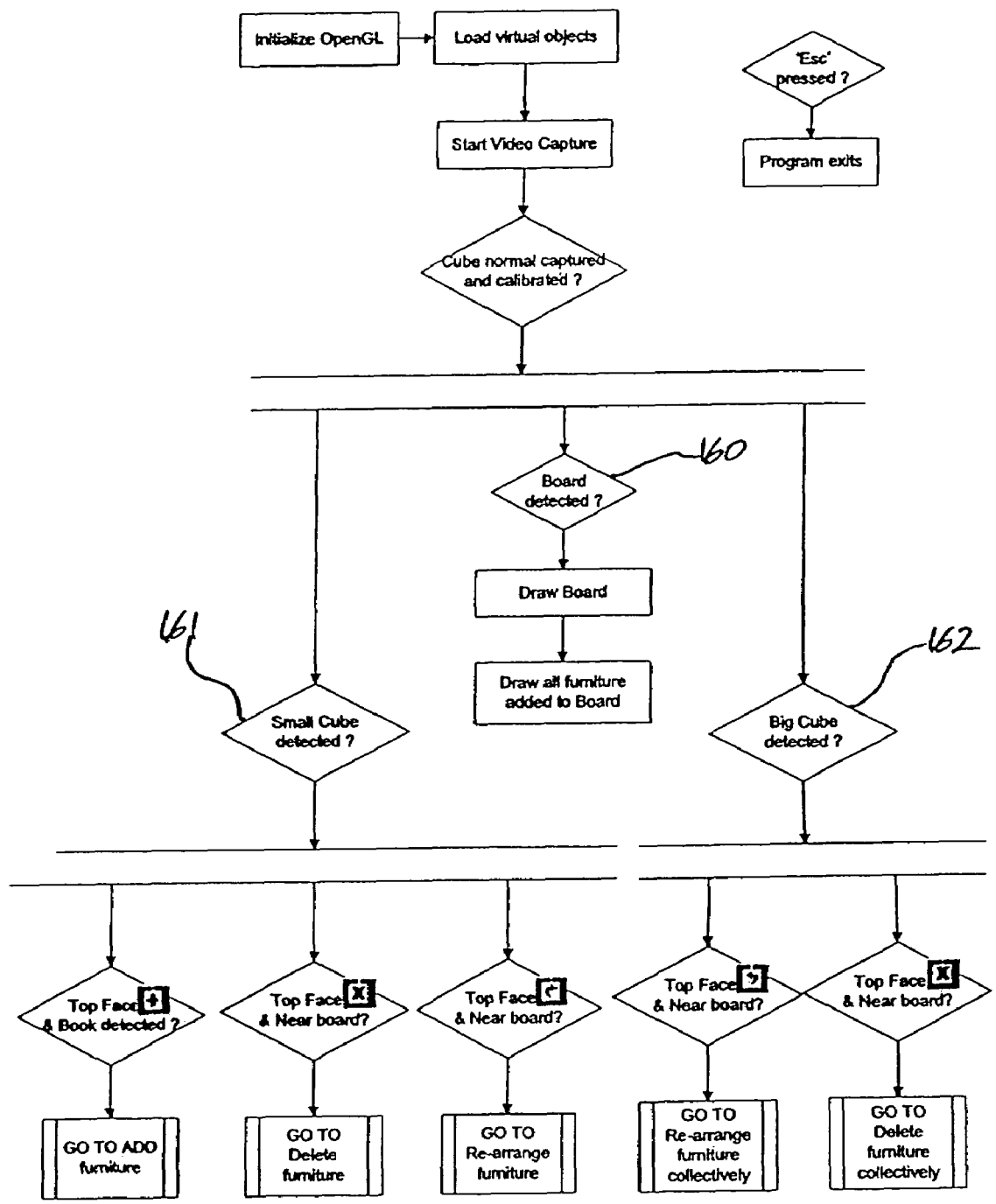
FIG. 16 is a process flow diagram of program flow of the Interior Design application.

FIG. 16 shows the execution of the AR Interior Design application in which the board 160, small cube 161 and big cube 162 are concurrently being searched for.

To enable the user to pick up a virtual object when the cube is near the marker 131 of the furniture catalogue requires the relative distance between the cube and the virtual object to be known. Since the MXR Toolkit returns the camera co-ordinates of each marker 131, markers are used to calculate distance. Distance between the marker on the cube and the marker for a virtual object is used for finding the proximity of the cube with respect to the marker.

The camera co-ordinates of each marker can be found. This means that the camera co-ordinates of the marker on the cube and that of the marker of the virtual object is provided by the MXR Toolkit. In other words, the co-ordinates of the cube marker with respect to the camera and the co-ordinates of the virtual object marker is known. TA is the transformation matrix to get from the camera origin to the virtual object marker. TB is the transformation matrix to get from the camera origin to the cube marker. However this does not give the relationship between cube marker and virtual object marker. From the co-ordinates, the effective distance can be found.

By finding TA −1, the transformation matrix to get from the virtual object to the camera origin is obtained. Using this information, the relative position of cube with respect to virtual object marker is obtained. The proximity of the cube and the virtual object is of interest only. Hence only the translation needed to get from the virtual object to the cube is required (i.e. Tx, Ty, Tz), and the rotation components can be ignored.

$$\begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} = [T_A^{-1}][T_B] \quad \text{(Equation 6-1)}$$

Tz is used to measure if the cube if it is placed on the book or board. This sets the stage for picking and dropping objects. This value corresponds to the height of the cube with reference to the marker on top of the cube. However, a certain range around the height of the cube is allowed to account for imprecision in tracking.

Tx, Ty is used to determine if the cube is within a certain range of the book or the board. This allows for the cube to be in an 'adding' mode if it is near the book and on the loading area. If it is within the perimeter of the board or within a certain radius from the centre of the board, this allows the cube to be re-arranged, deleted, added or stacked onto other objects.

There are a few parameters to determine the state of the cube, which include: the top face of the cube, the height of the cube, and the position of the cube with respect to the board and book.

The system is calibrated by an initialisation step to enable the top face of the cube to be determined during interaction and manipulation of the cube. This step involves capturing the normal of the table before starting when the cube is placed on the table. Thus, the top face of the cube can be determined when it is being manipulated above the table by comparing the normal of the cube and the table top. The transformation matrix of the cube is captured into a matrix called tfmTable. The transformation matrix encompasses all the information about the position and orientation of the marker relative to the camera. In precise terms, it is the Euclidean transformation matrix which transforms points in the frame of reference of the tracking frame, to points in the frame of reference in the camera. The full structure in the program is defined as:

$$\begin{bmatrix} r_{11} & r_{12} & r_{13} & | & tx \\ r_{21} & r_{22} & r_{23} & | & ty \\ r_{31} & r_{32} & r_{33} & | & tz \end{bmatrix}$$

The last row in equation 6-1 is omitted as it does not affect the desired calculations. The first nine elements form a 3×3 rotation matrix and describe the orientation of the object. To determine the top face of the cube, the transformation matrix obtained from tracking each of the face is used and works out the following equation. The transformation matrix for each face of the cube is called tfmCube.

$$\text{Dot\_product} = tfmCube \cdot r_{13} * tfmTable \cdot r_{13} + \quad \text{(Equation 6-2)}$$
$$tfmCube \cdot r_{23} * tfmTable \cdot r_{23} +$$
$$tfmCube \cdot r_{33} * tfmTable \cdot r_{33}$$

The face of the cube which produces the largest Dot_product using the transformation matrix in equation 6-2 is determined as the top face of the cube. There are also considerations of where the cube is with respect to the book and board. Four positional states of the cube are defined as—Onboard, Offboard, Onbook and Offbook. The relationship of the states of cube with the position of it, is provided below:

| States of cube | Height of Cube - $t_z$ | Cube wrt board and book - $t_x$ and $t_y$ |
| --- | --- | --- |
| Onboard | Same as board | Within the boundary of board |
| Offboard | Above board | Within the boundary of board |
| Onbook | Same as cover of book | Near book (furniture catalog) |
| Offbook | Above the cover of book | Near book (furniture catalog) |

Figure 17:
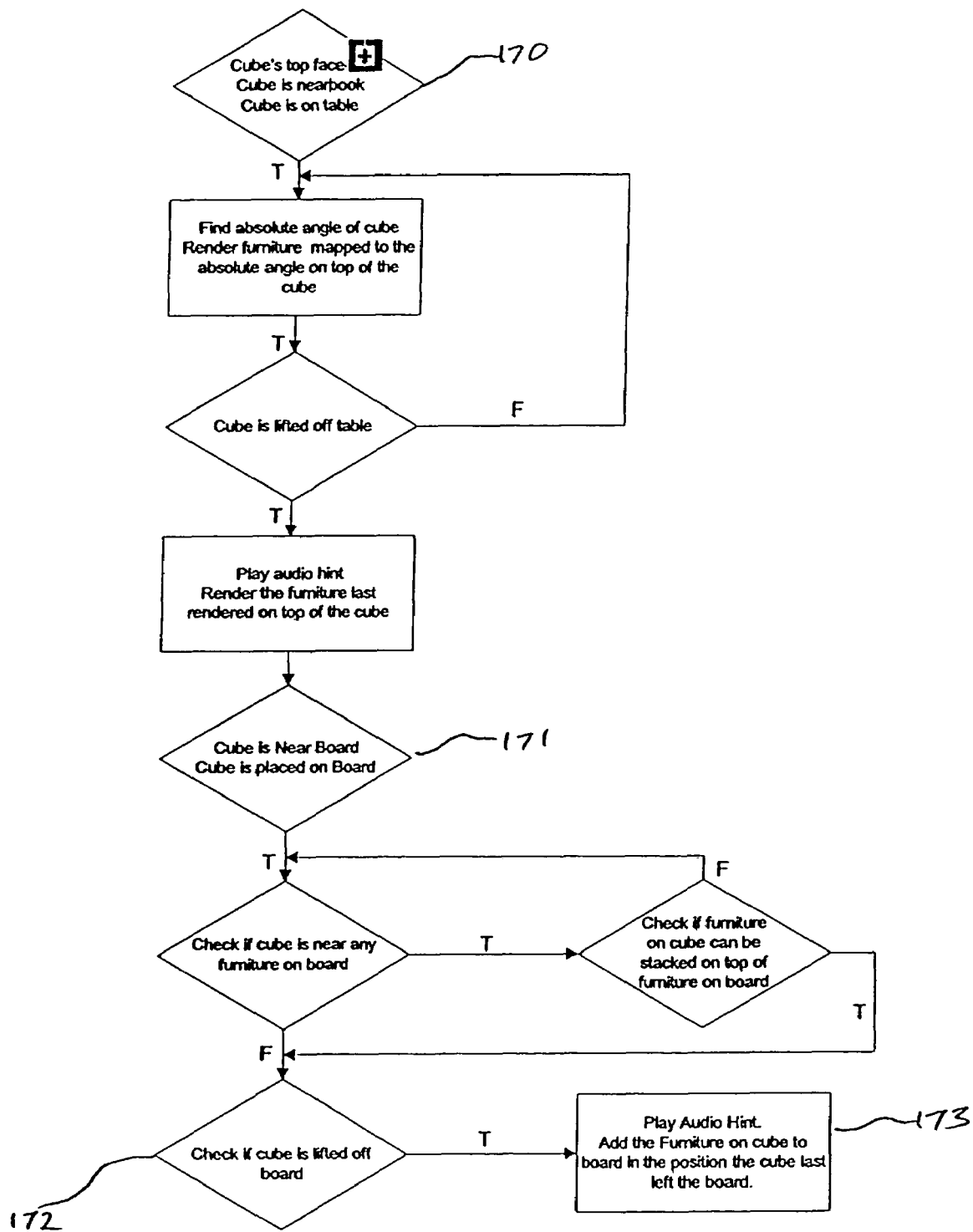
FIG. 17 is a process flow diagram for adding furniture.

Referring to FIG. 17, adding the furniture is done by using "+" marker as the top face of the cube 170. This is brought near the furniture catalogue with the page of the desired furniture facing up. When the cube is detected to be on the book (Onbook) 171, a virtual furniture object pops up on top of the cube. Using a rotating motion, the user can 'browse' through the catalogue as different virtual furniture items pop up on the cube while the cube is being rotated. When the cube is picked up (Offbook), the last virtual furniture item that seen on the cube is picked up 172. When the cube is detected to be on the board (Onboard), the user can add the furniture to the cube by lifting the cube off the board (Offboard) 173. To re-arrange furniture, the cube is placed on the board (Onboard) with the "right arrow" marker as the top face. When the cube is detected as placed on the board, the user can 'pick up' the furniture by moving the cube to the centre of the desired furniture.

Figure 18:
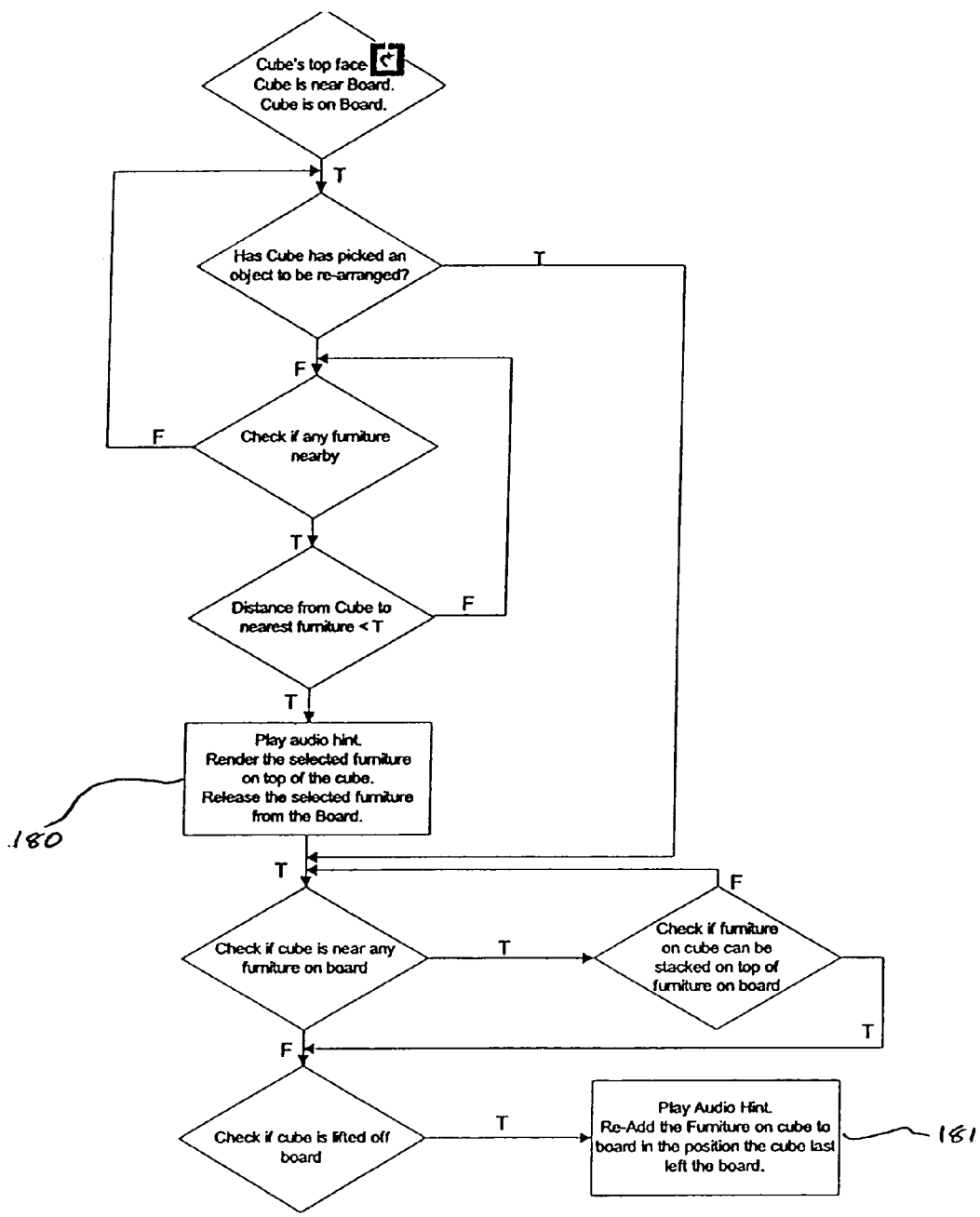
FIG. 18 is a process flow diagram for rearranging furniture.

Referring to FIG. 18, when the furniture is being 'picked up' (Offboard), the furniture is rendered on top of the cube and an audio hint is sounded 180. The user then moves the cube on the board to a desired position. When the position is selected, the user simply lifts the cube off the board to drop it into that position 181.

Figure 19:
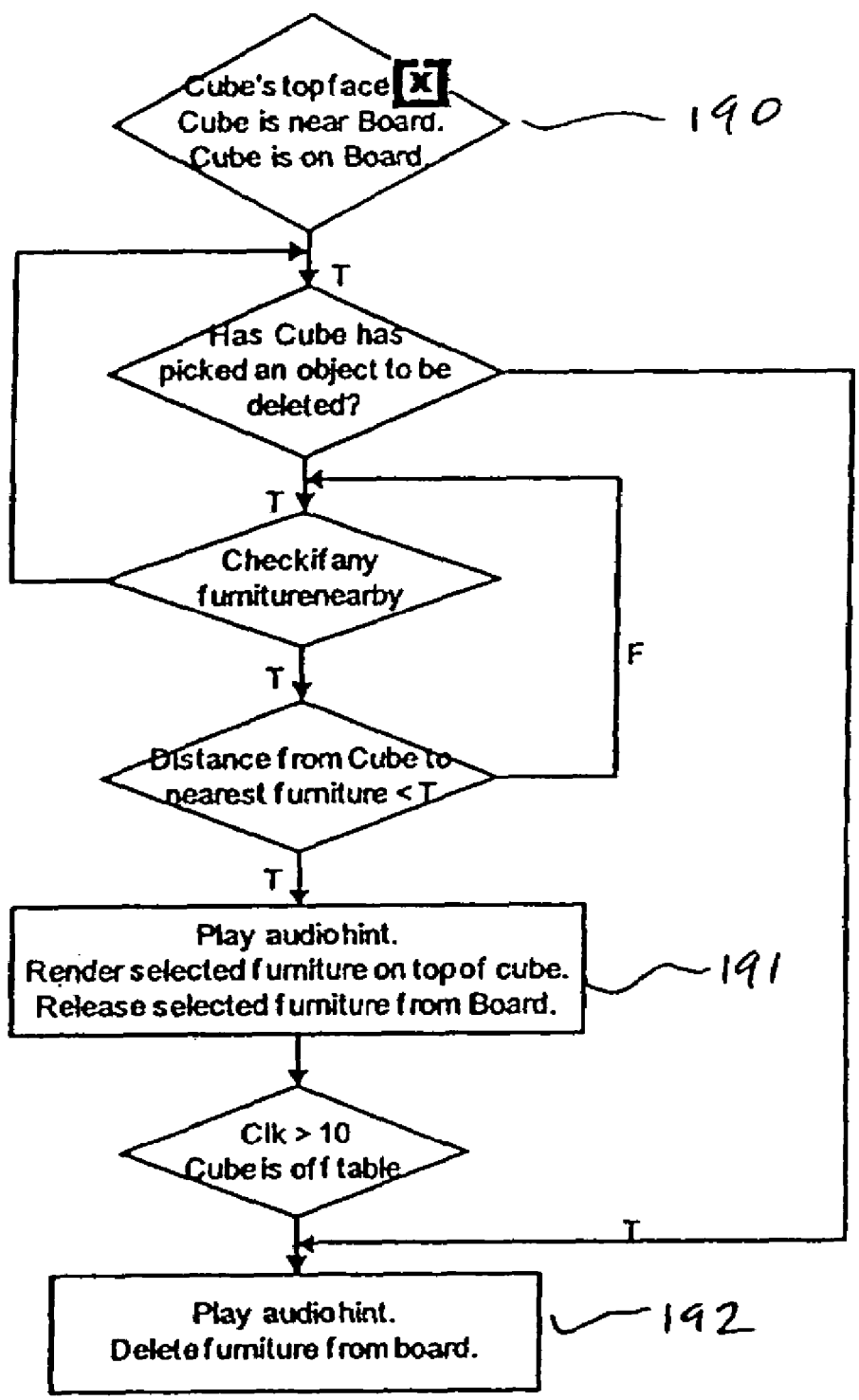
FIG. 19 is a process flow diagram for deleting furniture.

Referring to FIG. 19, to delete furniture, the cube is placed on the board (Onboard) with the "x" marker as the top face 190. When the cube is being detected to be on the board, the user can select the furniture by moving the cube to the centre of the desired furniture. When the furniture is successfully selected, the furniture is rendered on top of the cube and an audio hint is sounded 191. The user then lifts the cube off the board (Offboard) to delete the furniture 192.

When a furniture is being introduced or re-arranged, a problem to keep in mind is the physical constraints of the furniture. Similar to reality, furniture in an Augmented Reality world cannot collide with or 'intersect' with another. Hence, users are not allowed to add furniture when it collides with another.

Figure 20:
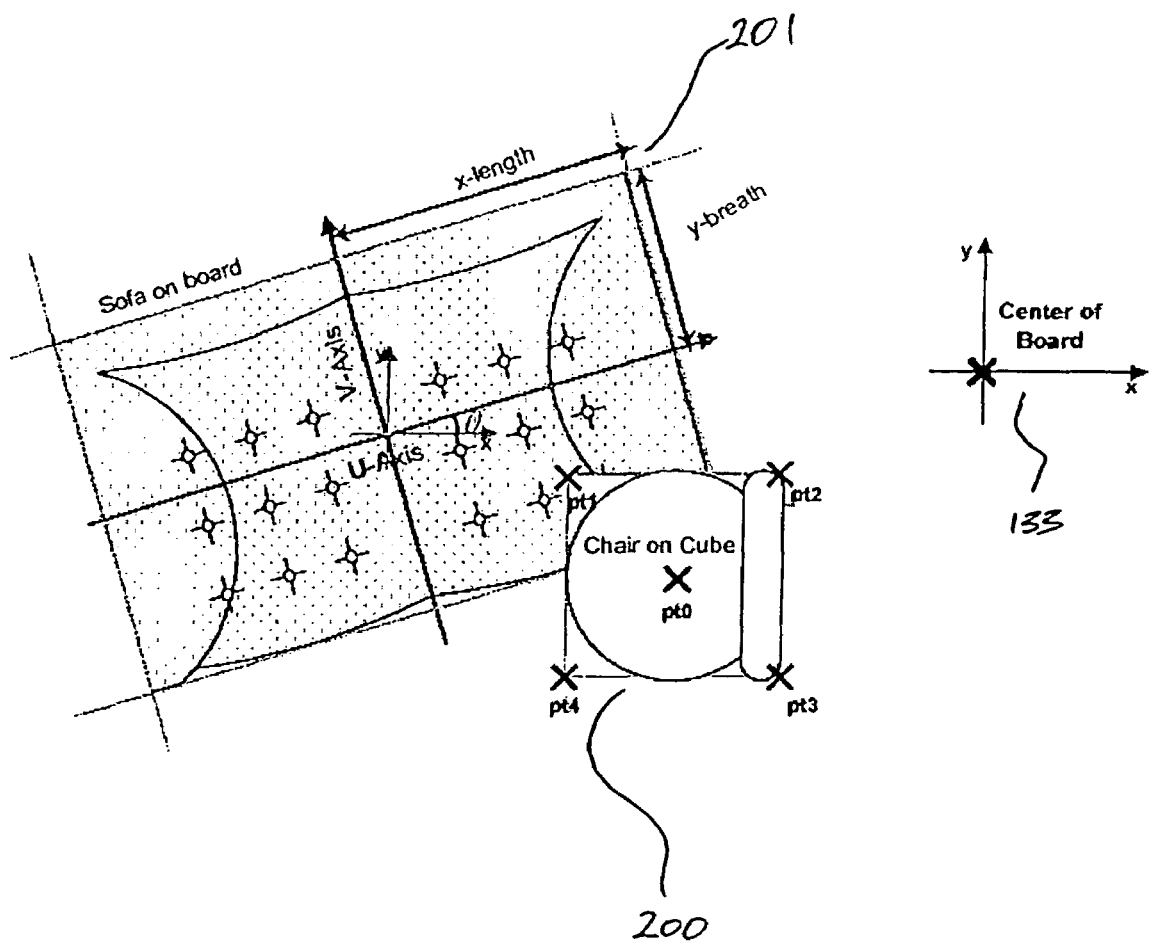
FIG. 20 depicts a collision of furniture items in the Interior Design application.

Referring to FIG. 20, one way to solve the problem of furniture items colliding is to transpose the four bounding co-ordinates 200 and the centre of the furniture being added to the co-ordinates system of the furniture which is being collided with. The points pt0, pt1, pt2, pt3, pt4 200 are transposed to the U-V axis of the furniture on board. The U-V co-ordinates of these five points are then checked against the x-length and y-breadth of the furniture on board 201.

$$U_N = \cos\theta(X_N - X_o) + \sin\theta(Y_N - Y_o)$$

$$V_N = \sin\theta(X_N - X_o) + \cos\theta(Y_N - Y_o)$$

where

| | |
|---|---|
| $(U_N, V_N)$ | New transposed coordinates with respect to the furniture on board |
| $\theta$ | Angle furniture on board makes with respect to X-Y coordinates |
| $(X_o, Y_o)$ | X-Y Center coordinates of furniture on board |
| $(X_N, Y_N)$ | Any X-Y coordinates of furniture on cube (from figure --, they represent pt0, pt1, pt2, pt3, pt4) |

Only if any of the U-V co-ordinates fulfil UN<x-length && VN<y-breadth will the audio effect sound. This indicates to the user that they are not allowed to drop the furniture item at the position and must move to another position before dropping the furniture item.

For furniture such as tables and shelves in which things can be stacked on top of them, a flag is provided in their furniture structure called stacked. This flag is set true when an object such as a plant, hi-fi unit or TV is detected for release on top of this object. This category of objects allows up to four objects placed on them. This type of furniture, for example, a plant, then stores the relative transformation matrix of the stacked object to the table or shelf in its structure in addition to the relative matrix to the centre of the board. When the camera has detected top face "left arrow" or "x" of the big cube, it goes into the mode of re-arranging and deleting objects collectively. Thus, if a table or shelf is to be picked, and if stacked flag is true, then, the objects on top of the table or shelf can be rendered according on the cube using the relative transformation matrix stored in its structure.

Although the interactive system 210 has been programmed using Visual C++ 6.0 on the Microsoft Windows 2000 platform, other programming languages are possible and other platforms such as Linux and MacOS X may be used.

Although a Dragonfly camera 211 has been described, web cameras with at least 640×480 pixel video resolution may be used.

Although the system 210 has been described in one embodiment as software, it is possible for all software functionality to be hard-wired into a circuit which is connected to the electrical circuitry of the camera. Hence it is envisaged that the image processing functions of the computer software be performed by a camera alone.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed is:

1. An interactive system for providing a mixed reality experience to a user, the system comprising:
   an object having at least two surfaces, each surface having a marker;
   an image capturing device to capture images of the object in a first scene; and
   a microprocessor configured to track the position and orientation of the object in the first scene by tracking at least two surfaces of the object and identifying at least one marker;
   wherein the microprocessor is configured to retrieve multimedia content associated with an identified marker, and generates a second scene including the associated multimedia content superimposed over the first scene in a relative position to the identified marker; and
   wherein the microprocessor is configured to provide a mixed reality experience to a user using the second scene.

2. The system according to claim 1, wherein the marker is unoccluded.

3. The system according to claim 1, wherein the marker is a predetermined shape.

4. The system according to claim 3, wherein the microprocessor is configured to identify the marker by recognizing at least a portion of the shape.

5. The system according to claim 4, wherein the microprocessor is configured to determine the complete predetermined shape of the marker using the recognized portion of the shape.

6. The system according to claim 3, wherein the predetermined shape is a square.

7. The system according to claim 6, wherein the microprocessor is configured to recognize at least two corners of the square to determine the marker.

8. The system according to claim 1, wherein the marker includes a discontinuous border that has a single gap.

9. The system according to claim 8, wherein the marker comprises an image within the border.

10. The system according to claim 9, wherein the image is a geometrical pattern.

11. The system according to claim 10, wherein the pattern is matched to an exemplar stored in a repository of exemplars.

12. The system according to claim 10, wherein the microprocessor is configured to identify a marker if the border is partially occluded and if the pattern within the border is not occluded.

13. The system according to claim 8, wherein the color of the border produces a high contrast to the background color of the marker, to enable the background to be separated by the computer software.

14. The system according to claim 13, wherein the border color is black and the background color is white.

15. The system according to claim 1, further comprising a display device to display the second scene at the same time the second scene is generated.

16. The system according to claim 15, wherein the display device is a monitor, television screen, LCD or PDP.

17. The system according to claim 15, wherein the display device is a view finder of the image capture device or a projector to project images or video.

18. The system according to claim 15, wherein the video frame rate of the display device is in the range of twelve to thirty frames per second.

19. The system according to claim 1, wherein the image capture device is mounted above the display device.

20. The system according to claim 19, where the image capture device and display device face the user.

21. The system according to claim 20, wherein the object is manipulated between the user and the display device.

22. The system according to claim 1, wherein multimedia content includes two dimensional or three dimensional images, video or audio information.

23. The system according to claim 1, wherein the at least two surfaces of the object are substantially planar.

24. The system according to claim 23, wherein the at least two surfaces are joined together.

25. The system according to claim 23, wherein the object is a cube or polyhedron.

26. The system according to claim 1, wherein the object is foldable.

27. The system according to claim 26, wherein the object is a foldable cube for storytelling.

28. The system according to claim 1, wherein the microprocessor is part of a desktop or mobile computing device such as a Personal Digital Assistant (PDA), mobile telephone or other mobile communications device.

29. The system according to claim 1, wherein the image capturing device is a camera.

30. The system according to claim 29, wherein the camera is a CCD or CMOS video camera.

31. The system according to claim 29, wherein the camera, microprocessor and display device is provided in a single integrated unit.

32. The system according to claim 29, wherein the camera, microprocessor and display device is located in remote locations.

33. The system according to claim 1, wherein the associated multimedia content is superimposed over the first scene by rendering the associated multimedia content into the first scene, for every video frame to be displayed.

34. The system according to claim 1, wherein the position of the object is calculated in three dimensional space.

35. The system according to claim 34, wherein a positional relationship is estimated between the camera and the object.

36. The system according to claim 1, wherein the captured image is thresholded.

37. The system according to claim 36, wherein contiguous dark areas are identified using a connected components algorithm.

38. The system according to claim 37, wherein a contour seeking technique is used to identify the outline of these dark areas.

39. The system according to claim 38, wherein contours that do not contain four corners are discarded.

40. The system according to claim 38, wherein contours that contain an area of the wrong size are discarded.

41. The system according to claim 38, wherein straight lines are fitted to each side of a square contour.

42. The system according to claim 41, wherein the intersections of the straight lines may be used as estimates of corner positions.

43. The system according to claim 42, wherein a projective transformation is used to warp the region described by the corner positions to a standard shape.

44. The system according to claim 43, wherein the standard shape is cross-correlated with stored exemplars of markers to identify the marker and determine the orientation of the object.

45. The system according to claim 42, wherein the corner positions are used to identify a unique Euclidean transformation matrix relating to the position of the camera to the position of the marker.

46. The system according to claim 1, wherein the interactive system is an interior design application.

47. An interactive system for providing a mixed reality experience to a user, the system comprising:
   an image capturing device configured to capture images of an object in a first scene; and
   a microprocessor configured to track the position and orientation of the object in the first scene by tracking at least two surfaces of the object having a marker and identifying at least one marker;
   wherein the microprocessor is configured to retrieve multimedia content associated with an identified marker, and generates a second scene including the associated multimedia content superimposed over the first scene in a relative position to the identified marker; and
   wherein the microprocessor is configured to provide a mixed reality experience to a user using the superposition of the multimedia content and the first scene.

48. A method for providing a mixed reality experience to a user, the method comprising:
   capturing in a first scene, images of an object having at least two surfaces, each surface having a marker;
   tracking the position and orientation of the object in the first scene by tracking at least two surfaces of the object;
   identifying at least one marker;
   wherein multimedia content associated with an identified marker is retrieved, and a second scene is generated including the associated multimedia content superimposed over the first scene in a relative position to the identified marker, to provide a mixed reality experience to a user.

49. An image capturing device to provide a mixed reality experience to a user, the device comprising:
   an image processing module to receive captured images of an object in a first scene; and
   a tracking module to track the position and orientation of the object in the first scene by tracking at least two surfaces of the object where each surface has a marker, and identifying at least one marker;
   wherein the device retrieves multimedia content associated with an identified marker, and generates a second scene including the associated multimedia content superimposed over the first scene in a relative position to the identified marker, to provide a mixed reality experience to a user.

* * * * *